(12) United States Patent
Anzai et al.

(10) Patent No.: US 7,748,041 B2
(45) Date of Patent: Jun. 29, 2010

(54) TOOL, METHOD, AND PROGRAM FOR SUPPORTING SYSTEM SECURITY DESIGN/EVALUATION

(75) Inventors: Kousuke Anzai, Yokohama (JP); Masato Arai, Yokohama (JP); Yasuhiko Nagai, Tokyo (JP); Hidaka Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1069 days.

(21) Appl. No.: 11/410,044

(22) Filed: Apr. 25, 2006

(65) Prior Publication Data

US 2006/0242711 A1  Oct. 26, 2006

(30) Foreign Application Priority Data

Apr. 25, 2005 (JP) ............................. 2005-126934
Nov. 4, 2005 (JP) ............................. 2005-320511

(51) Int. Cl.
*G06F 12/14* (2006.01)
(52) U.S. Cl. .............................. 726/25; 726/4; 380/28; 380/202
(58) Field of Classification Search ............... 726/4, 726/25; 380/28, 202
See application file for complete search history.

(56) References Cited

U.S. PATENT DOCUMENTS

2002/0112156 A1 * 8/2002 Gien et al. ................... 713/156

2003/0210784 A1 * 11/2003 Noridomi et al. ............ 380/202

FOREIGN PATENT DOCUMENTS

| EP | 1 107 140 A2 | 6/2001 |
| JP | EP1107140 A3 * | 8/2000 |
| JP | 2001-222420 | 8/2001 |
| JP | 2002-034151 | 1/2002 |

OTHER PUBLICATIONS

Department of Trade and Industry, "Information Security Assurance Guidelines for the Commercial Sector", Nov. 2000.
ISO/IEC TR 15446 (Guide for the Production of PPs and STs), Version 0.93 Oct. 20, 2002.
Y. Nagai, et al., "Proposal of Basic Method of Designing Security of Information System Taking into Account Functional Adaptability", Journal of Information Processing Society of Japan, vol. 45, No. 4, pp. 1163-1175, Apr. 2004.

* cited by examiner

*Primary Examiner*—Taghi T Arani
*Assistant Examiner*—Gregory Lane
(74) *Attorney, Agent, or Firm*—Antonelli, Terry, Stout & Kraus, LLP.

(57) ABSTRACT

A design/evaluation support tool 100 is constructed from a table link use unit 110 identifying linkages between a threat-to-component correspondence table 125, a risk-value table 126, a component contribution rate table 127, and a risk-to-assurance level correspondence table 128, based on their respective duplicate items; and a component assurance level deriving unit 111 deriving an assurance level of each of components that conforms to a risk value of a threat that a security function of each of the components counters by weighting the risk value of the threat by a component rate of contribution based on linkages of the tables.

14 Claims, 32 Drawing Sheets

| | | O1 | O2 | O3 | O4 | O5 | O6 |
|---|---|---|---|---|---|---|---|
| T1 | ILLEGAL REFERENCE IS MADE TO CUSTOMER INFORMATION ON SERVER FROM CLIENT BY INSIDER WHO HAS NO RIGHT OF ACCESS TO THE CUSTOMER INFORMATION | 1 | 1 | 0 | 0 | 0 | 0 |
| T2 | ILLEGAL ACCESS IS MADE FOR UNAUTHORIZED ALTERATION TO WEB PAGE ON SERVER FROM CLIENT BY INSIDER | 0 | 0 | 1 | 1 | 0 | 0 |
| T3 | ILLEGAL ACCESS IS MADE FOR DELETION TO CUSTOMER INFORMATION ON SERVER BY MANAGER | 0 | 0 | 0 | 0 | 1 | 1 |

FIG. 3A

| | | FR1 | FR2 | FR3 | FR4 | FR5 | FR6 | FR7 | FR8 |
|---|---|---|---|---|---|---|---|---|---|
| O1 | PREVENTION OF ILLEGAL ACCESS TO CUSTOMER INFORMATION ON SERVER FROM CLIENT | 1 | 0 | 1 | 0 | 0 | 1 | 0 | 0 |
| O2 | LOGGING OF ACCESS TO CUSTOMER INFORMATION ON SERVER | 0 | 0 | 0 | 0 | 0 | 0 | 1 | 0 |
| O3 | PREVENTION OF ILLEGAL ACCESS TO WEB PAGE ON SERVER FROM CLIENT | 1 | 0 | 1 | 1 | 0 | 0 | 0 | 0 |
| O4 | LOGGING OF ACCESS TO WEB PAGE ON SERVER | 0 | 0 | 0 | 0 | 1 | 0 | 0 | 0 |
| O5 | PREVENTION OF ILLEGAL ACCESS TO CUSTOMER INFORMATION ON SERVER | 0 | 0 | 0 | 0 | 0 | 1 | 0 | 1 |
| O6 | LOGGING OF ACCESS TO CUSTOMER INFORMATION ON SERVER | 0 | 0 | 0 | 0 | 0 | 0 | 1 | 0 |

FIG. 3B

|  | CONTENTS OF FUNCTIONAL REQUISITES |
|---|---|
| FR1 | IDENTIFICATION/AUTHENTICATION OF CLIENT |
| FR2 | ACCESS CONTROL OF CLIENT |
| FR3 | IDENTIFICATION/AUTHENTICATION OF WEB SERVER USER |
| FR4 | ACCESS CONTROL OF WEB SERVER USER |
| FR5 | AUDIT OF WEB SERVER |
| FR6 | ACCESS CONTROL OF DB SERVER USER |
| FR7 | AUDIT OF DB SERVER |
| FR8 | IDENTIFICATION/AUTHENTICATION OF SERVER USER |

FIG. 4A

| | OS-A | | WEB SERVER-A | | | DBMS-A | | OS-B |
|---|---|---|---|---|---|---|---|---|
| | 4 | | 3 | | | 4 | | 4 |
| | F1 | F2 | F3 | F4 | F5 | F6 | F7 | F8 |
| | IDENTIFICATION/ AUTHENTICATION FUNCTION | ACCESS CONTROL FUNCTION | IDENTIFICATION/ AUTHENTICATION FUNCTION | ACCESS CONTROL FUNCTION | AUDIT FUNCTION | ACCESS CONTROL FUNCTION | AUDIT FUNCTION | IDENTIFICATION/ AUTHENTICATION FUNCTION |
| FR1 | 1 | 0 | 0 | 0 | 0 | 0 | 0 | 0 |
| FR2 | 0 | 1 | 0 | 0 | 0 | 0 | 0 | 0 |
| FR3 | 0 | 0 | 1 | 0 | 0 | 0 | 0 | 0 |
| FR4 | 0 | 0 | 0 | 1 | 0 | 0 | 0 | 0 |
| FR5 | 0 | 0 | 0 | 0 | 1 | 0 | 0 | 0 |
| FR6 | 0 | 0 | 0 | 0 | 0 | 1 | 0 | 0 |
| FR7 | 0 | 0 | 0 | 0 | 0 | 0 | 1 | 0 |
| FR8 | 0 | 0 | 0 | 0 | 0 | 0 | 0 | 1 |

FIG. 4B

| THREAT IDENTIFIER | RISK RANK |
|---|---|
| T1 | 4 |
| T2 | 2 |
| T3 | 3 |

|    | O1  | O2  | O3  | O4  | O5  | O6  |
|----|-----|-----|-----|-----|-----|-----|
| T1 | 0.8 | 0.2 | 0   | 0   | 0   | 0   |
| T2 | 0   | 0   | 0.8 | 0.2 | 0   | 0   |
| T3 | 0   | 0   | 0   | 0   | 0.8 | 0.2 |

FIG. 6A

|    | FR1 | FR2 | FR3 | FR4 | FR5 | FR6 | FR7 | FR8 |
|----|-----|-----|-----|-----|-----|-----|-----|-----|
| O1 | 0.4 | 0   | 0.2 | 0   | 0   | 0.4 | 0   | 0   |
| O2 | 0   | 0   | 0   | 0   | 0   | 0   | 1.0 | 0   |
| O3 | 0.4 | 0   | 0.2 | 0.4 | 0   | 0   | 0   | 0   |
| O4 | 0   | 0   | 0   | 0   | 1.0 | 0   | 0   | 0   |
| O5 | 0   | 0   | 0   | 0   | 0   | 0.8 | 0   | 0.2 |
| O6 | 0   | 0   | 0   | 0   | 0   | 0   | 1   | 0   |

FIG. 6B

|    | OS-A | WEB SERVER-A | DBMS-A | OS-B |
|----|------|--------------|--------|------|
| T1 | 0.32 | 0.16         | 0.52   | 0    |
| T2 | 0.32 | 0.68         | 0      | 0    |
| T3 | 0    | 0            | 0.84   | 0.16 |

FIG. 6C

| RISK RANK | ASSURANCE LEVEL |
|---|---|
| 7~ | 7 |
| 6 | 6 |
| 5 | 5 |
| 4 | 4 |
| 3 | 3 |
| 2 | 2 |
| 1 | 1 |
| 0 | 0 |

FIG. 7

| RANK | USER RELIABILITY |
|---|---|
| LOW | HISTORY ON USER UNDERGOES NO CHECK |
| MEDIUM | HISTORY ON USER UNDERGOES BASIC SECURITY CHECK; FOR EXAMPLE, THERE IS A DOCUMENTARY CHECK, SUCH THAT TWO SATISFACTORY DOCUMENTS ARE REFERRED TO FROM PERSONS KNOWING BUSYNESS ABILITY FOR AT LEAST MOST RECENT TWO YEARS |
| HIGH | HISTORY ON USER UNDERGOES THOROUGH SECURITY CHECK; FOR EXAMPLE, ALL INVESTIGATIONS ARE PERFORMED OF PREVIOUS CONVICTIONS, FINANCIAL HISTORY, EMPLOYMENT HISTORY, ETC., AS DECISION BY ORGANIZATION |
| HIGHEST | SPECIAL RELIABILITY CAN BE IMPOSED ON USER; THIS RELIABILITY MOSTLY OCCURS AFTER EMPLOYMENT IN ORGANIZATION FOR A CERTAIN PERIOD. THIS IS REQUIRED FOR A PERSON WHO WORKS AT SECRET AREA HANDLING INFORMATION ASSETS SUCH AS PAY BOOKS, PERSONAL AFFAIRS, PHYSICAL CONDITIONS, AND COMPANY STRATEGIES. |

FIG. 14A

| RANK | VALUE OF ASSET TO BE PROTECTED AT WHICH THREAT AIMS |
|---|---|
| HIGHEST | LEAKAGE, UNAUTHORIZED ALTERATION, AND DISAPPEARANCE OF ASSET TO BE PROTECTED MAY POTENTIALLY CAUSE BANKRUPTCY OR LAWSUIT |
| HIGH | LEAKAGE, UNAUTHORIZED ALTERATION, AND DISAPPEARANCE OF ASSET TO BE PROTECTED MAY CAUSE SERIOUS DAMAGE OVER ORGANIZATION |
| MEDIUM | LEAKAGE, UNAUTHORIZED ALTERATION, AND DISAPPEARANCE OF ASSET TO BE PROTECTED MAY BE HARMFUL TO ORGANIZATION |
| LOW | LEAKAGE, UNAUTHORIZED ALTERATION, AND DISAPPEARANCE OF ASSET TO BE PROTECTED MAY CAUSE ALMOST NO OR UTTERLY NO DAMAGE OVER ORGANIZATION. |

FIG. 14B

| PHYSICAL ACCESS CONDITION \ NETWORK ACCESS CONDITION | HIGH | MEDIUM | LOW |
|---|---|---|---|
| HIGH | HIGH | HIGH | MEDIUM |
| MEDIUM | HIGH | MEDIUM | LOW |
| LOW | MEDIUM | LOW | LOWEST |

FIG. 15A

| THE NUMBER OF USERS \ ACCESSIBILITY | HIGH | MEDIUM | LOW | LOWEST |
|---|---|---|---|---|
| 1001 - WORLDWIDE SCALE | HIGHEST | HIGH | MEDIUM | MEDIUM |
| 101- 1000 | HIGH | MEDIUM | MEDIUM | LOW |
| 2- 100 | MEDIUM | MEDIUM | LOW | LOWEST |
| 1 | MEDIUM | LOW | LOWEST | LOWEST |

FIG. 15B

| VULNERABILITY | HIGHEST | | | | HIGH | | | | MEDIUM | | | | LOW | | | | LOWEST | | | |
|---|---|---|---|---|---|---|---|---|---|---|---|---|---|---|---|---|---|---|---|---|
| USER RELIABILITY | LOW | MEDIUM | HIGH | HIGHEST | LOW | MEDIUM | HIGH | HIGHEST | LOW | MEDIUM | HIGH | HIGHEST | LOW | MEDIUM | HIGH | HIGHEST | LOW | MEDIUM | HIGH | HIGHEST |
| VALUE OF ASSET TO BE PROTECTED — HIGHEST | 7 | 6 | 5 | 5 | 6 | 5 | 4 | 4 | 5 | 4 | 4 | 3 | 4 | 4 | 3 | 3 | 4 | 3 | 3 | 2 |
| HIGH | 6 | 5 | 4 | 4 | 5 | 4 | 3 | 3 | 4 | 3 | 3 | 2 | 3 | 3 | 2 | 2 | 3 | 2 | 2 | 1 |
| MEDIUM | 4 | 4 | 3 | 3 | 4 | 3 | 2 | 2 | 3 | 3 | 2 | 2 | 3 | 2 | 2 | 1 | 2 | 2 | 1 | 0 |
| LOW | 3 | 3 | 2 | 2 | 3 | 3 | 2 | 1 | 3 | 2 | 1 | 0 | 2 | 2 | 1 | 0 | 2 | 2 | 1 | 0 |

FIG. 15C

SYSTEM SECURITY DESIGN/EVALUATION SUPPORT TOOL

| COMPONENT NAME | ASSURANCE LEVEL REQUIRED OF COMPONENT | ASSURANCE LEVEL OF SELECTED PRODUCT |
|---|---|---|
| OS-A | 6~4 | 4 |
| WEB SERVER-A | 6~4 | 3 |
| DBMS-A | 7~4 | 4 |
| OS-B | 3 | 4 |

| THREAT IDENTIFIER | RISK VALUE (TEN-THOUSAND-YEN × TIMES/YEAR) |
|---|---|
| T1 | 5000 |
| T2 | 500 |
| T3 | 1000 |

| RISK VALUE (TEN-THOUSAND-YEN × TIMES/YEAR) | ASSURANCE LEVEL |
|---|---|
| $100000 < x$ | 7 |
| $50000 < x \leq 100000$ | 6 |
| $10000 < x \leq 50000$ | 5 |
| $1000 < x \leq 10000$ | 4 |
| $500 < x \leq 1000$ | 3 |
| $100 < x \leq 500$ | 2 |
| $10 < x \leq 100$ | 1 |
| $0 < x \leq 10$ | 0 |

|  | AMOUNT OF DAMAGE (TEN-THOUSAND-YEN) | POSSIBILITY OF OCCURRENCE OF THREAT (TIMES/YEAR) | RISK VALUE (TEN-THOUSAND-YEN?TIMES/YEAR) |
|---|---|---|---|
| T1 | 1000 | 5 | 5000 |
| T2 | 100 | 5 | 500 |
| T3 | 1000 | 1 | 1000 |

FIG. 24

|  | FR1 | FR2 | FR3 | FR4 | FR5 | FR6 | FR7 | FR8 | |
|---|---|---|---|---|---|---|---|---|---|
| COUNTER RISK VALUE | 0 | 0 | 880 | 160 | 100 | 0 | 0 | 0 | ← 1003, 3001 |

|  | FR1 | FR2 | FR3 | FR4 | FR5 | FR6 | FR7 | FR8 | |
|---|---|---|---|---|---|---|---|---|---|
| DEGREE OF IMPORTANCE | 0 | 0 | 0.75 | 0.5 | 0.5 | 0 | 0 | 0 | 3002 |

|  | FR1 | FR2 | FR3 | FR4 | FR5 | FR6 | FR7 | FR8 | |
|---|---|---|---|---|---|---|---|---|---|
| WEB SERVER A ASSURANCE LEVEL: 2 | 0 | 0 | 0.75 | 0.5 | 0 | 0 | 0 | 0 | 3003 |
| AUDIT TOOL A ASSURANCE LEVEL: 3 | 0 | 0 | 0 | 0.75 | 0.25 | 0 | 0 | 0 | 3004 |

3201

|  | FR1 | FR2 | FR3 | FR4 | FR5 | FR6 | FR7 | FR8 | |
|---|---|---|---|---|---|---|---|---|---|
| IN-CHARGE PATTERN (1) DEGREE OF FUNCTION ACHIEVEMENT C1 | 0 | 0 | 0.75 | 0.5 | 0.25 | 0 | 0 | 0 | 3011 |
| IN-CHARGE PATTERN (2) DEGREE OF FUNCTION ACHIEVEMENT C2 | 0 | 0 | 0.75 | 0.75 | 0.25 | 0 | 0 | 0 | 3012 |

|  | REQUIRED ASSURANCE LEVEL | | DEGREE OF ASSURANCE ADAPTABILITY | DEGREE OF FUNCTION ADAPTABILITY | |
|---|---|---|---|---|---|
|  | WEB SERVER A ASSURANCE LEVEL: 2 | AUDIT TOOL A ASSURANCE LEVEL: 3 | | | |
| IN-CHARGE PATTERN (1) | 3~4 | 1~1 | 4 | 0.031 | 3021 |
| IN-CHARGE PATTERN (2) | 3~3 | 2~2 | 3 | 0.063 | 3022 |

FIG. 30B

TOOL, METHOD, AND PROGRAM FOR SUPPORTING SYSTEM SECURITY DESIGN/EVALUATION

INCORPORATION BY REFERENCE

This application claims priority based on Japanese patent applications, No. 2005-126934 filed on Apr. 25, 2005 and No. 2005-320511 filed on Nov. 4, 2005, the entire contents of which are incorporated herein by reference.

BACKGROUND

The present invention relates generally to a system security design/evaluation support tool, a system security design/evaluation support method, and a system security design/evaluation support program, and, more particularly, to a technique deriving a proper assurance level of components (products or newly developed parts) making up an information system from the viewpoint of security assurance in particular, of techniques supporting the system security design and evaluation in the system design and evaluation phases, and further to a technique deriving products of proper assurance levels while satisfying function requisites and suppressing costs in a stage of designing an information system.

In these years, IT products having various functions for the purpose of security measures are being provided in plurality by vendors. Among those IT products, increasing in number year by year are products whose security levels have been evaluated and certified according to the international security evaluation criteria ISO/IEC 15408 (CC: Common Criteria) that is criteria on security function design/evaluation.

The security evaluation in this ISO15408 refers to verifying whether a security function meeting a security objective defined for a subject of evaluation (a product or a system) is provided and whether the security function is securely implemented. ISO15408 defines seven stages of EALs (Evaluation Assurance Levels), hereinafter referred to simply as "assurance levels", indicative of the range, depth, and strictness of this verification. To acquire a higher assurance level of certification, a strict inspection needs to be performed to a greater depth over a wider range, resulting in increase in time and costs required for the security evaluation.

Here, ISO15408 does not definitely define the method of setting the assurance levels, and hence there may arise cases, e.g., where in case of products the setting is made referring to its industry standard level or where the setting is made by the developer itself in consideration of the use/range of use of the product.

Meanwhile, as to systems, they are composed of constituent elements (hereinafter, referred to as components) such as combinations of existing IT products, and newly developed parts. The components, i.e., IT products and newly developed parts have various assurance levels, and may include IT products that have not been evaluated and certified. To design and evaluate a system, it is preferable to confirm that the products having proper assurance levels are introduced therein and that the newly developed parts have been verified at proper assurance levels, as well as to configure the system by combining components having security functions that counter expected threats to the system.

In the reference 1, Department of Trade and Industry, "INFORMATION SECURITY ASSURANCE GUIDELINES FOR THE COMMERCIAL SECTOR", November, 2000, Internet URL:HTTP://WWW.DTI.GOV.UK/INDUSTRY_FILES/PDF/CAG1.PDF, it is proposed, as an example of the method of setting IT product or system assurance levels, a conventional technique ranking into, e.g., high, medium, and low, each of the magnitude of vulnerability of a subject of evaluation, the reliability of a user using the subject of evaluation, and the influence that an organization managing the subject of evaluation suffers under a threat, and obtaining the magnitude of a risk from the rank to thereby easily set the assurance level conforming to the magnitude of the risk obtained. Also, as to assurance levels of the components forming a system, the idea has been presented that a higher assurance level be required of components having a factor to raise the risk of a threat (a subject of protection being high in asset value and the occurrence possibility of a threat being great, etc.). Refer to the reference 2, "ISO/IEC TR 15446 (Guide for the Production of PPs and STs), Version 0.93 2002-10-20 (Working Draft N3374)", October, 2002, Internet URL:HTTP://WWW.IPA.GO.JP/SECURITY/JISEC/DOCUMENTS/27N3374PP STGUIDE_V093.PDF.

Moreover, in performing security designing-installation of a system, it is generally more reasonable to select, from these IT products, IT products of appropriate assurance levels or a combination of plural IT products that have an appropriate security function matching the objective of the system of interest with suppressing cost than to newly develop all functions from scratch.

For the security designing-installation of a system, a method of selecting an optimum combination of IT products in terms of security function and cost has been proposed as an example method of selecting/combining. IT products suitable for the system. Refer to the reference 3, Y. Nagai, et al., "Proposal of Basic Method of Designing Security of Information System Taking into Account Functional Adaptability", JOURNAL OF INFORMATION PROCESSING SOCIETY OF JAPAN, Vol. 45, No. 4, April 2004, pp. 1163-1175. This method is a method which, after setting the degrees of importance of security function requisites (or a security measure target) to be satisfied by the system and the degrees of satisfaction of IT products and the degrees of association between the security function requisites required of the system and functions of the IT products, derives, using a fuzzy synthesis operation, such a combination of IT products from various choices of IT products as to maximize the degree of functional adaptability to requisites to be satisfied by the system under constraints that costs (expense for introduction, setting, management, etc., of IT products and time for introduction-setting, and the like) should fall within permissible ranges.

Furthermore, a method of deciding an optimum configuration to achieve low cost and high reliability from system configuration candidates taking into account both system reliability and equipment cost has been proposed as an example method of deciding configuration candidates for a system. (Refer to the reference 4, Japanese Patent Application Laid-Open Publication No. 2002-34151.)

SUMMARY OF THE INVENTION

For example, when applying the technique in the above reference 1 to a system, it would be difficult to obtain the magnitude of a risk on a component-by-component basis of the system. The reason is that ranking "the influence that a managing organization suffers" would be infeasible unless it is definite that security of which asset the component serves to what extent is definite. The method disclosed in the above reference 1 is merely a method of easily obtaining the magnitude of a qualitative risk, and does not provide a procedure taking into account the above, making it difficult to set a proper assurance level that conforms to the magnitude of the risk for each of the components. Also, the reference 2 only states the idea that a proper assurance level that conforms to the magnitude of the risk for each component be set but does not describe a specific setting method.

If a high assurance level matching a part having a high risk is set across the board for the entire system because a proper assurance level cannot be set for each of the components, an assurance level higher than necessary is required of some components. Hence, the cost of design-evaluation (expense, time, etc.) is likely to increase, and since the number of existing IT products having a higher assurance level than is required of the components is reduced, the range of product choice would be narrowed. On the other hand, if a low assurance level matching a part having a low risk is set across the board, some components may not satisfy their appropriate assurance level.

Furthermore, in designing the security of a system, by using the conventional art of the reference 3, an optimum product or a combination of plural products from the viewpoint of function and cost can be selected from plural IT product candidates according to selection criteria in terms of security function and cost. Meanwhile, as IT products evaluated and certified in security according to ISO15408 increase in number, it is becoming desirable to select a combination of IT products of appropriate assurance levels taking into account security assurance as well. However, the conventional art of the reference 3 does not deal with security assurance, one of the selection criteria, by its nature and hence cannot select a combination of optimum IT products taking into account security assurance as well. Furthermore, since it is difficult to set an assurance level for each component that matches the degree of a risk that the component counters, it is also difficult to formulate a target function and constraint conditions used to solve an optimization problem including the viewpoint of security assurance.

Moreover, when considering the applying of the conventional art (reference 1) to system security design-evaluation and the introduction of the viewpoint of security assurance instead of system reliability, it is difficult to derive an optimum combination of products from the viewpoint of security assurance because the reference 1 does not describe a method of obtaining system reliability (assurance level) on a component basis.

The present invention provides a system security design/evaluation support tool, a system security design/evaluation support method, and a system security design/evaluation support program, that derive proper assurance levels conforming to the magnitudes of risks of the components making up a subject system.

Further, the present invention provides a system security design/evaluation support tool, a system security design/evaluation support method, and a system security design/evaluation support program, that derive a product or a product combination having proper assurance levels conforming to the magnitudes of risks of the components making up a subject system.

The system security design/evaluation support tool of the present invention is a tool deriving an assurance level of security for each of components of a subject system operating on an information processing apparatus and made up of one or more components, the tool comprising a threat-to-component correspondence table storing therein correspondence between a threat that the subject system assumes and a security function that the component has; a risk-value table storing therein information of a risk value indicative of the magnitude of a risk of the threat; a component contribution rate table storing therein information on the magnitude of effect of the security function that the component has and that counters the threat; a risk-to-assurance level correspondence table storing therein correspondence between a risk value and an assurance level required corresponding to the risk value; a table link use unit identifying linkages between the threat-to-component correspondence table, the risk-value table, the component contribution rate table, and the risk-to-assurance level correspondence table, based on their respective duplicate items; and a component assurance level deriving unit deriving an assurance level of each of the components that conforms to a risk value of a threat that a security function of each of the components counters, by weighting the risk value of the threat by a component rate of contribution based on linkages of the tables.

The system security design/evaluation support tool preferably may comprise a contribution rate calculating unit calculating the component rate of contribution by identifying a linkage between a table storing therein the rate of contribution of a security objective corresponding to the threat, a table storing therein the rate of contribution of a security function requisite corresponding to the security objective, and a table storing therein correspondence between the security function requisite and the security function that each of the components has, based on their respective duplicate items, and by identifying, on a threat-by-threat basis, the rate of contribution of the security objective borne by the security function requisite of the security function that each of the components has.

In the system security design/evaluation support tool, the component assurance level deriving unit preferably may identify a group of threats corresponding to each of the components using the threat-to-component correspondence table, calculate as a counter risk value of the component the sum of the risk values of all threats included in the group of threats using the risk-value table, and match the counter risk value against the risk-to-assurance level correspondence table to derive a required assurance level of the component.

In the system security design/evaluation support tool, the component assurance level deriving unit preferably may identify a group of threats corresponding to the component using the threat-to-component correspondence table, calculate as a counter risk value of the component the sum of the products of the respective risk values of the respective threats of the group of threats and respective component rates of contribution corresponding thereto using the risk-value table and the component contribution rate table, and match the counter risk value against the risk-to-assurance level correspondence table to derive a required assurance level of the component.

In the system security design/evaluation support tool, the component assurance level deriving unit preferably may identify a group of threats corresponding to the component using the threat-to-component correspondence table, calculate as a lowest counter risk value of the component the maximum of the risk values of all threats included in the group of threats using the risk-value table, and match the lowest counter risk value against the risk-to-assurance level correspondence table to derive a lowest assurance level of the component.

In the system security design/evaluation support tool, the component assurance level deriving unit preferably may identify a group of threats corresponding to the component using the threat-to-component correspondence table, calculate as a lowest counter risk value of the component the maximum of the products of the respective risk values of the respective threats of the group of threats and respective component rates of contribution corresponding thereto using the risk-value table and the component contribution rate table, and match the lowest counter risk value against the risk-to-assurance level correspondence table to derive a lowest assurance level of the component.

In the system security design/evaluation support tool, the component assurance level deriving unit preferably may identify a group of threats corresponding to the component using the threat-to-component correspondence table, calculate as a lowest counter risk value of the component the minimum of the risk values of all threats of the group of threats using the risk-value table, and match the lowest counter risk value against the risk-to-assurance level correspondence table to derive a lowest assurance level of the component.

In the system security design/evaluation support tool, the component assurance level deriving unit preferably may identify a group of threats corresponding to the component using the threat-to-component correspondence table, calculate as a lowest counter risk value of the component the minimum of the products of the respective risk values of the threats of the group of threats and respective corresponding component contribution rates using the risk-value table and the component contribution rate table, and match the lowest counter risk value against the risk-to-assurance level correspondence table to derive a lowest assurance level of the component.

The system security design support tool of the present invention is a tool which derives an optimum product combination out of one or more candidate products and which product is to be in charge of a security function requisite to be satisfied by the system, for a subject system operating on an information processing apparatus and made up of one or more components. The tool comprises a threat-to-function requisite correspondence table storing therein correspondence between expected threats to the subject system and security function requisites to be satisfied by the system; a risk-value table storing therein information of a risk value indicative of the magnitude of a risk of each of the threats; a function requisite-to-product correspondence table storing therein correspondence between each of the candidate products and a security function requisite that the candidate product has; a product assurance level table storing therein an assurance level of each of the candidate products; a function requisite contribution rate table storing therein information on the magnitudes of respective effects of security function requisites that counters the threats; a risk-to-assurance level correspondence table storing therein correspondence between a risk value and an assurance level that is required in response to the risk value; a table link use unit that identifies linkages between the threat-to-function requisite correspondence table, the risk-value table, the function requisite-to-product correspondence table, the product assurance level table, the function requisite contribution rate table, and the risk-to-assurance level correspondence table on the basis of their respective duplicate items; a component assurance level deriving unit that creates product combination candidates each formed of one or more candidate products which satisfy security function requisites to be satisfied by the subject system based on the linkages between the tables and, for each of the created product combination candidates, creates one or more in-charge patterns in each of which each product of the product combination candidate is in charge of a security function requisite to be satisfied by the subject system and, for each of all the created in-charge patterns of the product combination candidates, calculates a component contribution rate of each product of the product combination candidate which relates to the degree of an effect of the respective security function requisite to counter one of the threats based on the linkages between the tables, and weights the risk value of the respective threat with the component contribution rate, thereby deriving an assurance level to be required of each of the products that matches the risk value of the respective threat that the respective security function counters; a degree-of-assurance adaptability deriving unit that, for each of all the created in-charge patterns of the product combination candidates, compares in value an assurance level to be required of each of the products and an assurance level of each product of the product combination candidate identified by referencing the product assurance level table, thereby deriving a degree of assurance adaptability; and an optimum product combination deciding unit that identifies as an optimum product combination one of the in-charge patterns of the product combination candidates whose degree of assurance adaptability is optimal and decides which products are to be in charge of the security function requisites to be satisfied by the subject system.

The system security design support tool preferably may further comprise a contribution rate calculating unit that identifies a linkage between a table storing contribution rates of security objectives corresponding to the threats and a table storing contribution rates of security function requisites corresponding to the security objectives on the basis of respective duplicate items of the tables, and identifies, for each threat, contribution rates of security objectives of which the security function requisites are to be in charge, thereby calculating contribution rates of the security function requisites.

In the system security design support tool, the component assurance level deriving unit preferably may identify a threat group for each of the components for each of the in-charge patterns of the product combination candidates with use of the threat-to-function requisite correspondence table and the function requisite-to-product correspondence table, calculate the sum of the risk values of all threats of the threat group as a counter risk value for the component with use of the risk-value table, and match the counter risk value against the risk-to-assurance level correspondence table, thereby deriving an assurance level to be required of the component.

In the system security design support tool, the component assurance level deriving unit preferably may identify a threat group for each of the components for each of the in-charge patterns of the product combination candidates with use of the threat-to-function requisite correspondence table and the function requisite-to-product correspondence table, calculate as a counter risk value for the component the sum of the products of the respective risk values of the threats of the threat group and respective corresponding component contribution rates with use of the risk-value table and the calculated component contribution rates, and match the counter risk value against the risk-to-assurance level correspondence table, thereby deriving an assurance level to be required of the component.

In the system security design support tool, the component assurance level deriving unit preferably may identify a threat group for each of the components for each of the in-charge patterns of the product combination candidates with use of the threat-to-function requisite correspondence table and the function requisite-to-product correspondence table, calculate the maximum of the risk values of all threats of the threat group as a lowest counter risk value for the component with use of the risk-value table, and match the counter risk value against the risk-to-assurance level correspondence table, thereby deriving a lowest assurance level of the component.

In the system security design support tool, the component assurance level deriving unit preferably may identify a threat group for each of the components for each of the in-charge patterns of the product combination candidates with use of the threat-to-function requisite correspondence table and the function requisite-to-product correspondence table, calculate as a lowest counter risk value for the component the maximum of the products of the respective risk values of the threats of the threat group and respective corresponding component contribution rates with use of the risk-value table and the calculated component contribution rates, and match the lowest counter risk value against the risk-to-assurance level correspondence table, thereby deriving a lowest assurance level of the component.

In the system security design support tool, the component assurance level deriving unit preferably may identify a threat group for each of the components for each of the in-charge patterns of the product combination candidates with use of the threat-to-function requisite correspondence table and the function requisite-to-product correspondence table, calculate the minimum of the risk values of all threats of the threat group as a lowest counter risk value for the component with use of the risk-value table, and match the lowest counter risk value against the risk-to-assurance level correspondence table, thereby deriving an lowest assurance level of the component.

In the system security design support tool, the component assurance level deriving unit preferably may identify a threat group for each of the components for each of the in-charge patterns of the product combination candidates with use of the threat-to-function requisite correspondence table and the function requisite-to-product correspondence table, calculate as a lowest counter risk value for the component the minimum of the products of the respective risk values of the threats of the threat group and respective corresponding component contribution rates with use of the risk-value table and the calculated component contribution rates, and match the lowest counter risk value against the risk-to-assurance level correspondence table, thereby deriving a lowest assurance level of the component.

In the system security design support tool, the optimum product combination deciding unit preferably may calculate, for each of the in-charge patterns of the product combination candidates, a degree of function achievement of each function requisite with use of a degree-of-function achievement calculating table storing a degree of satisfaction of users for each of the products and degrees of association between the function requisites and the products, derive a degree of function adaptability by taking an average of the absolute values of the differences between the calculated degrees of function achievement and respective degrees of importance of the function requisites to be satisfied by the system, calculate, for each of the in-charge patterns of the product combination candidates, as a degree of combination adaptability the sum of the products of the degree to which security function and assurance are valued, and the degree of function adaptability and the degree of assurance adaptability respectively, and identify as an optimum product combination an in-charge pattern of the product combination candidates of which the degree of combination adaptability is optimal, thereby deciding which products are to be in charge of the security function requisites to be satisfied by the system.

In the system security design support tool, the optimum product combination deciding unit preferably may reference a product cost table storing a cost for introduction of each product and, for each of the in-charge patterns of the product combination candidates, derives a total introduction cost by taking the sum of costs for introduction of the products, and calculate, for each of the in-charge patterns of the product combination candidates, as a degree of combination adaptability the sum of the products of the degree to which security function, assurance, and cost are valued, and the degree of function adaptability, the degree of assurance adaptability, and the total introduction cost respectively.

The system security design/evaluation support method of the present invention is a method of deriving an assurance level of security for each of components of a subject system operating on an information processing apparatus and made up of one or more components, the method comprising, by use of a threat-to-component correspondence table storing therein correspondence between a threat that the subject system assumes and a security function that the component has, a risk-value table storing therein information of a risk value indicative of the magnitude of a risk of the threat, a component contribution rate table storing therein information on the magnitude of effect of the security function that the component has and that counters the threat, and a risk-to-assurance level correspondence table storing therein correspondence between a risk value and an assurance level required corresponding to the risk value, identifying linkages between the tables based on their respective duplicate items; and weighting the risk value of the threat by a component rate of contribution based on linkages of the tables, to derive an assurance level of each of the components that conforms to a risk value of a threat that a security function of each of the components counters.

The system security design/evaluation program of the present invention is a program operable to drive a computer to execute a method of deriving an assurance level of security for each of components of a subject system operating on an information processing apparatus and made up of one or more components, the computer forced to execute the steps of, by use of a threat-to-component correspondence table storing therein correspondence between a threat that the subject system assumes and a security function that the component has, a risk-value table storing therein information of a risk value indicative of the magnitude of a risk of the threat, a component contribution rate table storing therein information on the magnitude of effect of the security function that the component has and that counters the threat, and a risk-to-assurance level correspondence table storing therein correspondence between a risk value and an assurance level required corresponding to the risk value, identifying linkages between the tables based on their respective duplicate items; and weighting the risk value of the threat by a component rate of contribution based on linkages of the tables, to derive an assurance level of each of the components that conforms to a risk value of a threat that a security function of each of the components counters.

The system security design support method of the present invention is a method of deriving an optimum product combination out of one or more candidate products and which product is to be in charge of a security function requisite to be satisfied by the system, for a subject system operating on an information processing apparatus and made up of one or more components. The method comprises by use of a threat-to-function requisite correspondence table storing therein correspondence between expected threats to the subject system and security function requisites to be satisfied by the system, a risk-value table storing therein information of a risk value indicative of the magnitude of a risk of each of the threats, a function requisite-to-product correspondence table storing therein correspondence between each of the candidate products and a security function requisite that the candidate product has, a product assurance level table storing therein an assurance level of each of the candidate products, a function requisite contribution rate table storing therein information on the magnitudes of respective effects of security function requisites that counters the threats, and a risk-to-assurance level correspondence table storing therein correspondence between a risk value and an assurance level that is required in response to the risk value, identifying linkages between the threat-to-function requisite correspondence table, the risk-value table, the function requisite-to-product correspondence table, the product assurance level table, the function requisite contribution rate table, and the risk-to-assurance level correspondence table on the basis of their respective duplicate items; creating product combination candidates which each satisfy security function requisites to be satisfied by the subject system based on the linkages between the tables; for each of the created product combination candidates, creating one or more in-charge patterns in each of which each product of the product combination candidate is in charge of a security function requisite to be satisfied by the subject system; for each of all the created in-charge patterns of the product combination candidates, calculating a component contribution rate of each product of the product combination candidate which relates to the degree of an effect of the respective security function requisite to counter one of the threats based on the linkages between the tables, and weighting the risk value of the respective threat with the component contribution rate, thereby deriving an assurance level to be required of each of the products that matches the risk value of the respective threat that the respective security function counters; for each of all the created in-charge patterns of the product combination candidates, comparing in value an assurance level to be required of each of the products and an assurance level of each product of the product combination candidate identified by referencing the product assurance level table, thereby deriving a degree of assurance adaptability; and identifying as an optimum product combination one of the in-charge patterns of the product combination candidates whose degree of assurance adaptability is optimal and deciding which products are to be in charge of the security function requisites to be satisfied by the subject system.

The system security design support program of the present invention is a program operable to drive a computer to execute a method of deriving an optimum product combination out of one or more candidate products and which product is to be in charge of a security function requisite to be satisfied by the system, for a subject system operating on an information processing apparatus and made up of one or more components. The computer being forced to execute the steps of by use of a threat-to-function requisite correspondence table storing therein correspondence between expected threats to the subject system and security function requisites to be satisfied by the system, a risk-value table storing therein information of a risk value indicative of the magnitude of a risk of each of the threats, a function requisite-to-product correspondence table storing therein correspondence between each of the candidate products and a security function requisite that the candidate product has, a product assurance level table storing therein an assurance level of each of the candidate products, a function requisite contribution rate table storing therein information on the magnitudes of respective effects of security function requisites that counters the threats, and a risk-to-assurance level correspondence table storing therein correspondence between a risk value and an assurance level that is required in response to the risk value, identifying linkages between the threat-to-function requisite correspondence table, the risk-value table, the function requisite-to-product correspondence table, the product assurance level table, the function requisite contribution rate table, and the risk-to-assurance level correspondence table on the basis of their respective duplicate items; creating product combination candidates which each satisfy security function requisites to be satisfied by the subject system based on the linkages between the tables; for each of the created product combination candidates, creating one or more in-charge patterns in each of which each product of the product combination candidate is in charge of a security function requisite to be satisfied by the subject system; for each of all the created in-charge patterns of the product combination candidates, calculating a component contribution rate of each product of the product combination candidate which relates to the degree of an effect of the respective security function requisite to counter one of the threats based on the linkages between the tables, and weighting the risk value of the respective threat with the component contribution rate, thereby deriving an assurance level to be required of each of the products that matches the risk value of the respective threat that the respective security function counters; for each of all the created in-charge patterns of the product combination candidates, comparing in value an assurance level to be required of each of the products and an assurance level of each product of the product combination candidate identified by referencing the product assurance level table, thereby deriving a degree of assurance adaptability; and identifying as an optimum product combination one of the in-charge patterns of the product combination candidates whose degree of assurance adaptability is optimal and deciding which products are to be in charge of the security function requisites to be satisfied by the subject system.

The design/evaluation support tool of the present invention is a tool performing design support and/or evaluation support. Similarly, the design/evaluation support method is a method performing design support and/or evaluation support, and the design/evaluation support program is a program performing design support and/or evaluation support.

The above and other problems and solutions thereto disclosed by this application will become more apparent from the following detailed description of the embodiments when taken in conjunction with the accompanying drawings.

According to the present invention, proper assurance levels can be derived that conform to the magnitudes of risks of components making up a subject system.

Furthermore, according to the present invention, products of proper assurance levels can be derived that satisfies the function requisites of a system with suppressing cost.

These and other benefits are described throughout the present specification. A further understanding of the nature and advantages of the invention may be realized by reference to the remaining portions of the specification and the attached drawings.

BRIEF DESCRIPTION OF THE DRAWINGS

FIGS. 3A and 3B are diagrams of information example 1 stored in a threat-to-component correspondence table.

FIGS. 4A and 4B are diagrams of information example 2 stored in the threat-to-component correspondence table.

FIG. 5 is a diagram of an example of information stored in a risk-value table.

FIGS. 6A to 6C are diagrams of examples of information stored in rate of contribution data.

FIG. 7 is a diagram of an example of information stored in a risk-to-assurance level correspondence table.

FIGS. 14A and 14B are diagrams of case 3 for the operator to determine risk ranks based on risk analyses.

FIGS. 15A to 15C are diagrams of case 4 for the operator to determine risk ranks based on risk analyses.

FIG. 19 is a diagram of an example of a screen displaying the result of component-to-component REQUIRED assurance levels derived.

FIGS. 21A and 21B are diagrams of examples of information stored in a risk-value table and information stored in a risk-to-assurance level correspondence table according to a third embodiment.

FIG. 24 is a diagram of a case for an operator to determine risk values through risk analysis according to the third embodiment.

FIG. 30 is a diagram for explaining the operation of an in-charge-of-the-function requisite deciding unit according to the fourth embodiment.

DETAILED DESCRIPTION OF THE EMBODIMENTS

First Embodiment

Figure 1:
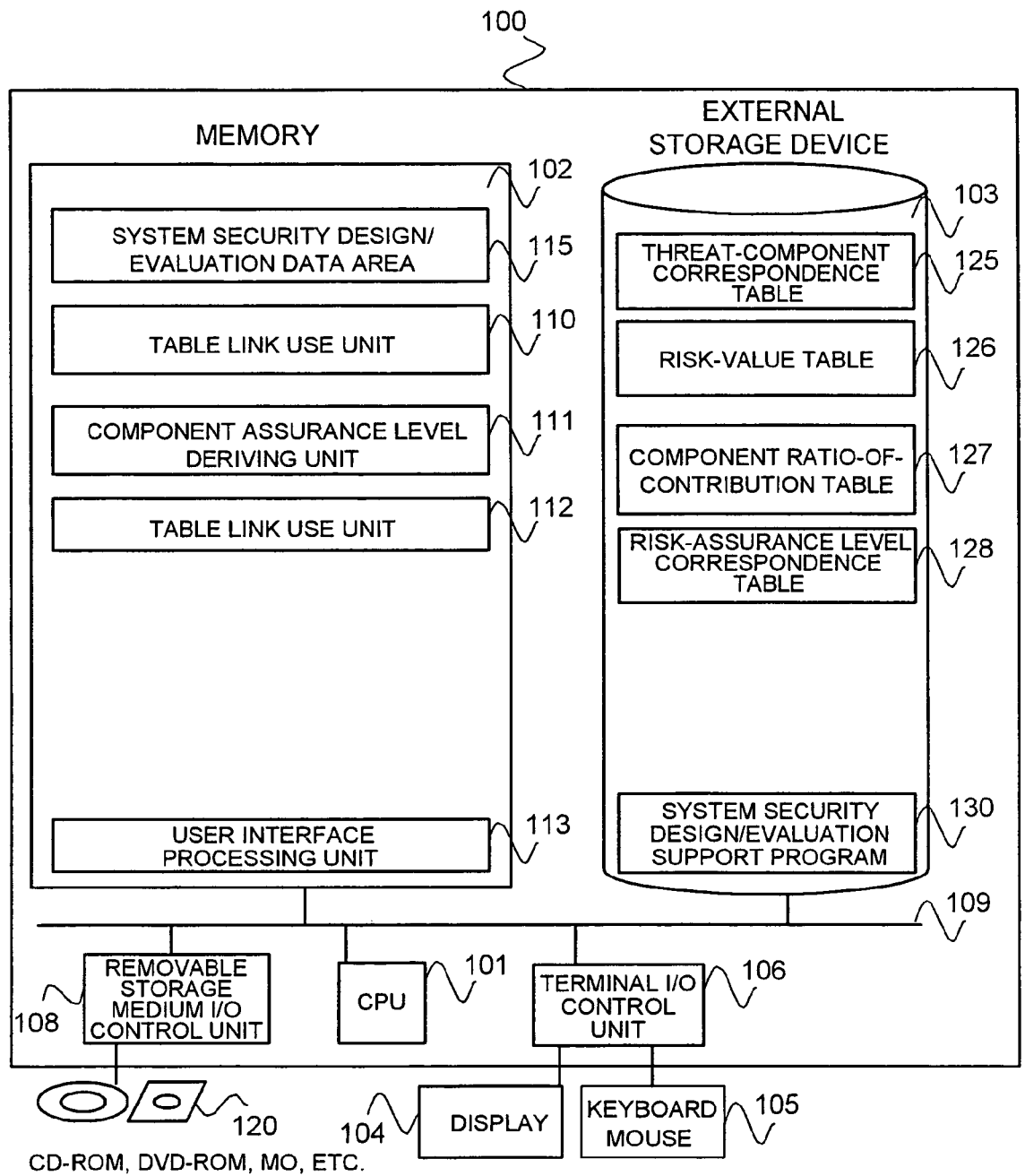
FIG. 1 is a schematic configuration diagram of a system security design/evaluation support tool.

A first embodiment of the present invention will now be described with reference to the drawings. FIG. 1 is a diagram of a configuration of a system security design/evaluation support tool according to this embodiment. In FIG. 1, the system security design/evaluation support tool is generally designated at 100, hereinafter "design/evaluation support tool 100", and is implemented by a CPU 101 running a system security design/evaluation support program 130 loaded in a memory 102, in an ordinary computer system including the CPU 101, the memory 102, an external storage device 103 such as an HDD, a terminal I/O control unit 106 that provides information to a user via a display device 104 such as a display, and an input device 105 such as a keyboard, a mouse, etc., and that accepts information from the user, a network control unit 107 for making a communication via a network, a removable storage medium I/O control unit 108 controlling read from and write to a removable storage medium 120 such as CD-ROM, DVD-ROM, MO, and flexible disk, and a bus 109 interconnecting these devices and units.

The external storage device 103 stores therein a threat-to-component correspondence table 125, a risk-value table 126 (threat risk data), a component contribution rate table 127, a risk-to-assurance level correspondence table 128, and the system security design/evaluation support program 130.

The system security design/evaluation support program 130 stored in the external storage device 103 is a program for implementing a table link use unit 110 and a component assurance level deriving unit 111. The table link use unit 110 identifies a linkage between the threat-to-component correspondence table 125, the risk-value table 126, the component contribution rate table 127, and the risk-to-assurance level correspondence table 128, based on their respective duplicate items. The component assurance level deriving unit 111 derives an assurance level of a component conforming to the risk value of a threat that the security function of the component counters by weighting the risk value of the threat by the component rate of contribution based on linkages of the tables.

The system security design/evaluation support program 130 is also a program for implementing a contribution rate calculating unit 112. The contribution rate calculating unit 112 calculates the component rate of contribution by identifying a linkage between a table (table 600 of FIG. 6A) storing the rate of contribution of a security objective corresponding to the threat, a table (table 610 of FIG. 6B) storing the rate of contribution of a security function requisite corresponding to the security objective, and a table (table 620 of FIG. 6C) storing correspondence between the security function requisite and the security function of the component, based on their respective duplicate items, and by identifying, on a threat-by-threat basis, the rate of contribution of the security objective borne by the security function requisite of the security function of the component. The system security design/evaluation support program 130 is also a program for implementing a user interface processing unit 113.

The memory 102 has a system security design/evaluation data area 115 set therein. The data area 115 is an area for temporarily storing information acquired or read through operations of the table link use unit 110, the component assurance level deriving unit 111, the contribution rate calculating unit 112, and the user interface processing unit 113.

The CPU 101 implements the functional blocks 110 to 113 by running the system security design/evaluation support program 130 loaded in the memory 102.

Figure 2:
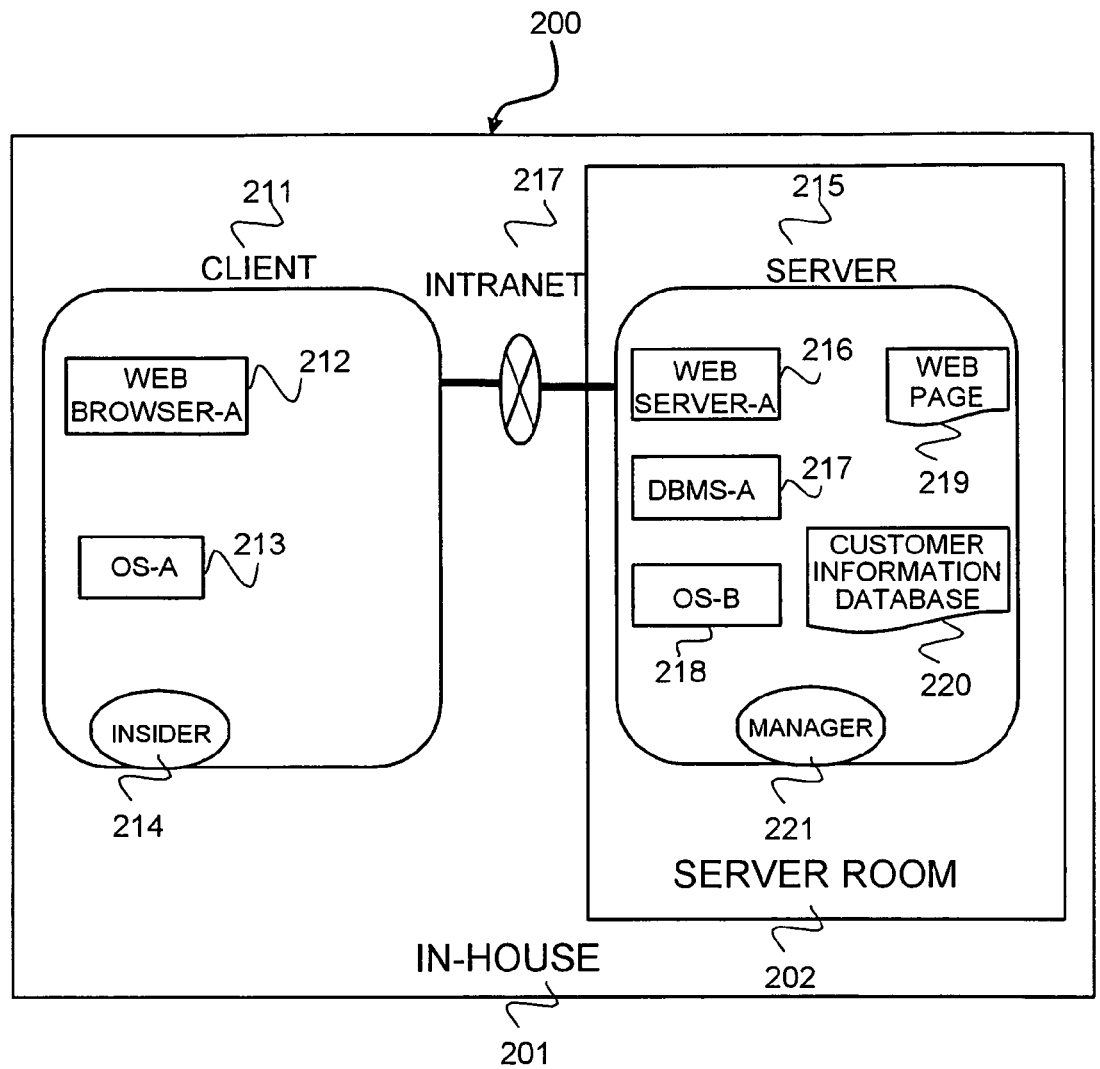
FIG. 2 is a configuration diagram of a subject system for use in description of the embodiment.

Description will then be made of an example of the configuration of a subject system for use in explaining the configuration and operation of the system security design/evaluation support tool of this embodiment. FIG. 2 illustrates an example of the subject system. In FIG. 2, the subject system is designated at 200 and is a system that provides in-house information service in a company for example.

The subject system 200 of this embodiment is disposed in an organization (in-house 201) accessible by anyone who has passed through a reception site, and has a client 211 and a server 215. The client 211 is connected via an intranet 217 to the server 215. The server 215 is disposed in a server room 202 that is isolated by a door locked so as to be accessible by only a manager 221.

The client 211 has a WEB browser-A 212 and an OS (Operating System)-A 213. The server 215 has a WEB server-A 216, a DBMS (Database Management System)-A 217, and an OS-B 218.

An insider 214 and the manager 221 are supposed to be persons physically accessible to the subject system 200. The insider 214 accesses the server 215 using the WEB browser-A 212, to refer to a WEB page 219 and a customer information database 220.

This subject system 200 is based on the assumption that some insiders 214 have the right of access to the WEB page 219 and the customer database 220 but other insiders 214 have no right of access thereto and that the WEB page 219 and the customer information database 220 referred to are not retained nor cached in the client 211.

The various types of tables stored in the external storage device 103 will then be described in detail. First description will be made of information stored in the threat-to-component correspondence table 125. FIG. 3A shows a correspondence table 300 of relations between the threats and the security objectives. In the table 300, a column 301 represents identifiers of threats, a column 302 represents contents of threats, and a row 303 represents identifiers of security objectives. A matrix portion represents correspondence between the threats and the security objectives, with "0" denoting that a correspondence is absent, and with "1" denoting that correspondence is present.

FIG. 3B shows a correspondence table 310 of the relations between the security objectives and functional requisites. In the table 310, a column 303 represents identifiers of security objectives (same as the identifiers of security objectives shown in the row 303 of FIG. 3A), a column 311 represents contents of security objectives, and a row 312 represents identifiers of functional requisites. A matrix portion represents correspondence between the security objectives and the functional requisites, with "0" denoting that correspondence is absent, and with "1" denoting that correspondence is present.

FIG. 4A is a diagram showing a contents table 400 of the functional requisites. In the table 400, a column 312 represents identifiers of functional requisites (same as the identifiers of functional requisites shown in the row 312 of FIG. 3B), and a column 401 represents contents of functional requisites.

FIG. 4B is a diagram showing a table 410 of correspondence between the functional requisites and components (products or newly developed parts). In the table 410, a column 312 represents identifiers of functional requisites (same as the identifiers of functional requisites shown in the row 312 of FIG. 3B), a row 412 represents component names, a row 413 represents actually selected assurance levels of products or newly developed parts, a row 414 represents identifiers of functions of components, and a row 415 represents function names of components. A matrix portion represents correspondence between the functional requisites and the component functions, with "0" denoting that correspondence is absent, and with "1" denoting that correspondence is present. In this case, the assurance levels of products or newly developed parts at the row 413 are evaluation assurance levels (1 to 7) defined as EALs, with assurance level "0" being imparted to products that have no security evaluation/certification.

Figure 5:
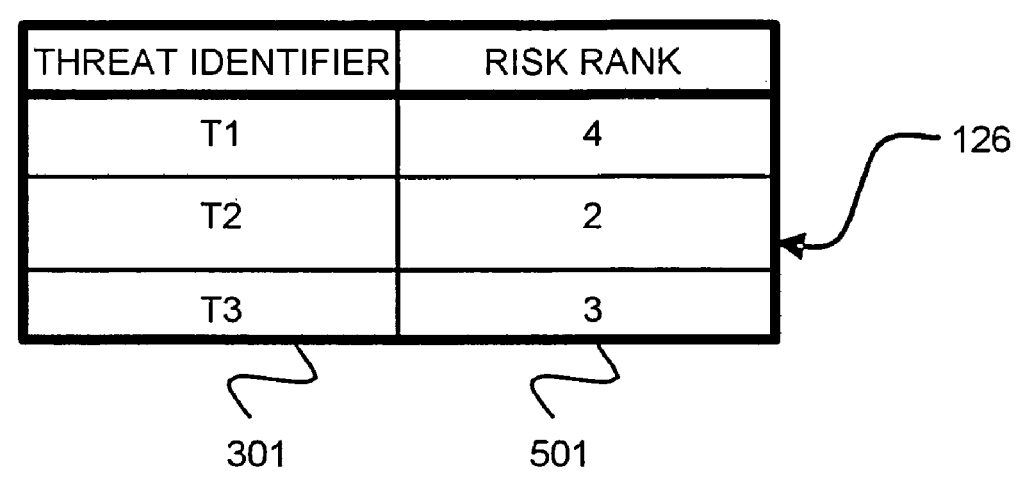

Reference will then be made to FIG. 5 to describe information stored in the risk-value table 126. FIG. 5 is a diagram showing the risk-value table 126. In this table 126, a column 301 represents threat identifiers, and a column 501 represents risk ranks corresponding to threats. This risk rank is obtained by classifying the magnitudes of threats into several ranks based on the results of risk analysis effected by a designer or an evaluator. The magnitude of risk of a threat can be represented by two fashions: one is a quantitative representation (doubled risk rank of a threat results in doubled magnitude of the threat risk), and the other is a qualitative representation (vertical relationships of the magnitudes of threat risks are represented relatively). While in this embodiment the qualitative representation is employed and described with the magnitudes of risks classified into risk ranks, the same method as described hereinbelow would be applicable to the case of the quantitative representation of the magnitude of risk.

Referring to FIGS. 6A to 6C, information stored in the component contribution rate table 127 will then be described. FIG. 6A shows a table 600 indicative of rates of contribution of security objectives to threats. In the table 600, a column 301 represents identifiers of threats, and a row 303 represents identifiers of security objectives. A matrix portion represents rates of contribution of the security objectives to the threats, with values 0 to 1 being distributed such that they add up to 1 in the row direction.

FIG. 6B shows a table 610 indicative of rates of contribution of functional requisites to security objectives. In the table 610, a column 303 represents identifiers of security objectives (same as the identifiers of security objectives shown in the row 303 of FIG. 6A), and a row 312 represents identifiers of functional requisites. A matrix portion represents rates of contribution of the functional requisites to the security objectives, with values 0 to 1 being distributed such that they add up to 1 in the row direction.

FIG. 6C shows a table 620 indicative of rates of contribution of components to threats. In the table 620, a column 301 represents identifiers of threats, and a row 412 represents component names. A matrix portion represents rates of contribution of the components to the threats, with values 0 to 1 being distributed such that they add up to 1 in the row direction. In this case, the rates of contribution of the components to the threats are values calculated from the respective rates of contribution shown in FIGS. 6A and 6B and correspondence between the functional requisites and the components shown in FIG. 4B. A method of calculation will be described later in this embodiment.

Reference is then made to FIG. 7 to describe information stored in the risk-to-assurance level correspondence table 128. FIG. 7 shows the risk-to-assurance level correspondence table 128. In this table 128, a column 701 represents risk ranks, and a column 702 represents assurance levels corresponding to the risk ranks. Data of the risk-to-assurance level correspondence table 128 indicate correspondence with the assurance level conforming to the magnitude of risk of a threat depending on the type of risk analysis effected by a designer or an evaluator, the data being set in advance by the designer or the evaluator. When the data of the risk-to-assurance level correspondence table 128 are set by a designer of a subject to be evaluated, the evaluator should use the data after judgment from the viewpoint of a third person of whether correspondence is established with the assurance level conforming to the magnitude of the risk of the threats.

Description will then be made of the operation of the design/evaluation support tool 100 that is based on the system security design/evaluation support method. Here a person who designs or evaluates the subject system 200 using the design/evaluation support tool 100 is hereinafter referred to as "an operator". The following are two examples of use image that the present design/evaluation support tool 100 assumes.

(1) The tool 100 is used for evaluation of a subject system 200 by a "designer" himself/herself who has designed or developed the subject system 200 as an "operator".

(2) The tool 100 is used for evaluation of a subject system 200 that a "designer" has designed or developed by an "evaluator" who is a third person as an "operator".

In the case of (1), the designer makes an evaluation on the basis of information designed by himself/herself. In the case of (2), the evaluator accepts information designed by the designer in the form of electronic data or paper medium and makes an evaluation after verification of the information from the viewpoint of the third person. Therefore, if the designed information has a defect, the evaluation is made after consultation with the designer. It is to be noted that the use image is not intended to limit the form of use of this embodiment, and that other forms of use than the above would be conceivable. The scope of application of this embodiment is not limited to only the security evaluation of the subject system 200 but extends to the security design of the subject system 200. It becomes feasible in this case to design the subject system 200 by appropriately combining the components each having an assurance level conforming to the magnitude of each risk through the operator using the design/evaluation support tool 100 of this embodiment.

The assumptions are that the designer or the evaluator of the subject system 200 prepares in advance information on threats to the subject system 200, security objectives, functional requisites, components, and products and newly developed parts actually selected as the components, correspondence therebetween, and a risk for each threat, and that at least the information required to set the tables shown in FIGS. 3A and 3B, FIGS. 4A and 4B, and FIG. 5 is already definite.

Figure 8:
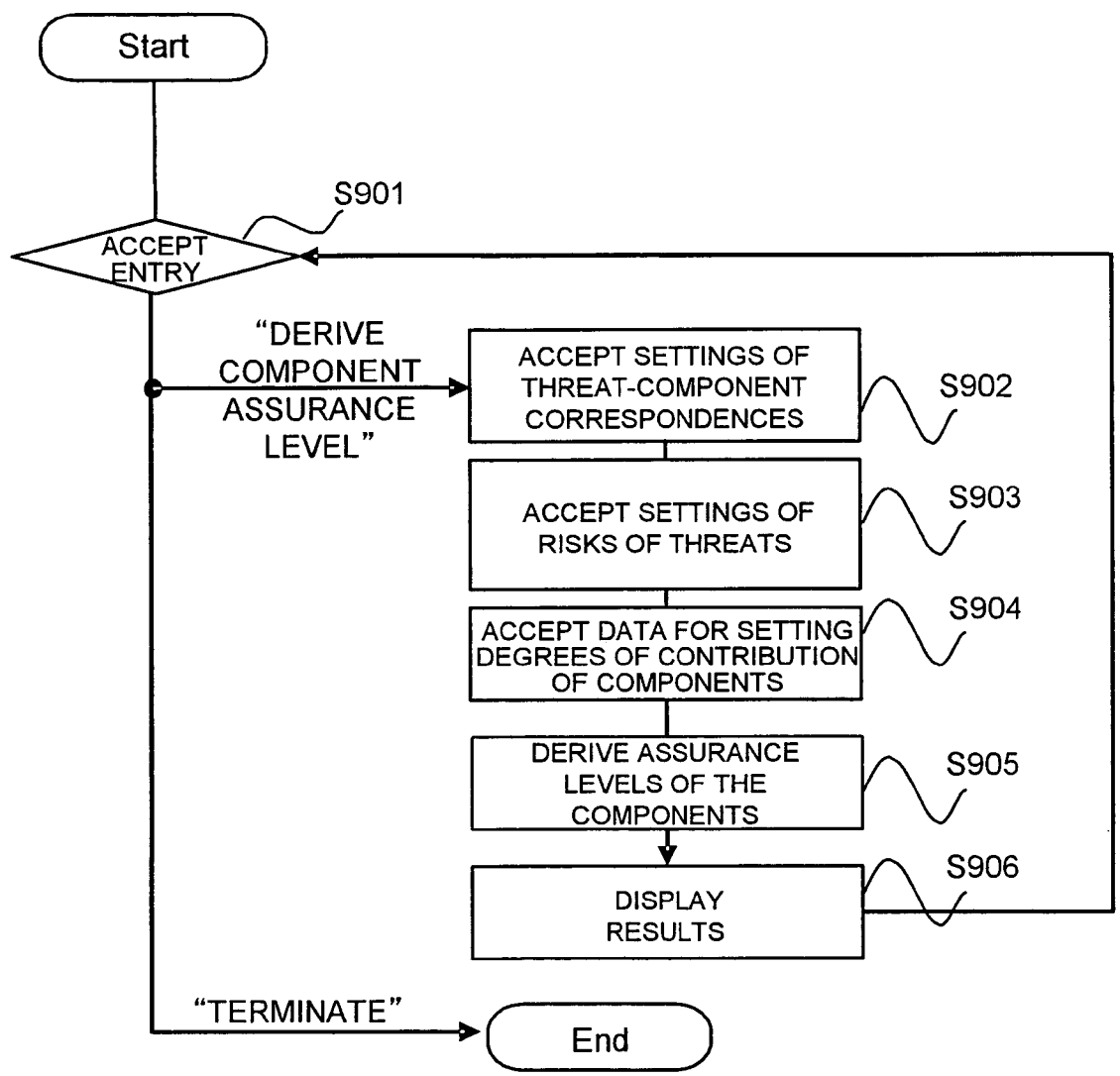
FIG. 8 is a flowchart of operations of the tool in the system security design/evaluation support method.

FIG. 8 is a flowchart of a procedure of processes effected by the design/evaluation support tool in the system security design/evaluation support method. First of all, the design/evaluation support tool 100 accepts an entry in response to an instruction from an operator (S901). Specifically, the user interface processing unit 113 outputs a screen 1001 accepting an instruction as shown in FIG. 9 by way of example to the display 104, etc.

Figure 9:
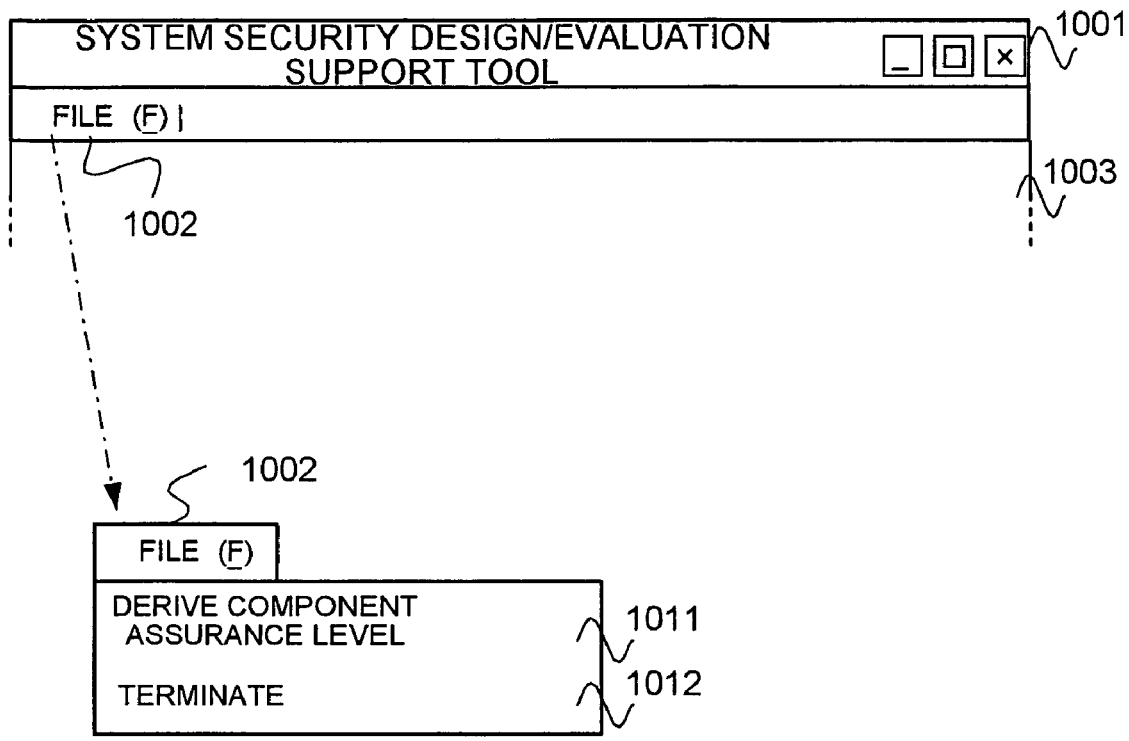
FIG. 9 is a diagram of an example of a screen displayed at execution of the system security design/evaluation support tool.

In FIG. 9, the work screen 1001 includes a file menu 1002, a main display section 1003, etc. The file menu 1002 allows selection of a submenu such as "Derive component assurance level" 1011, or "Terminate" 1012. The main display section 1003 is capable of accepting an input operation from the input device 105. "Terminate" 1012 of the submenu is a submenu terminating the design/evaluation support tool 100.

The operator uses the input device 105 to e.g., select the submenu of the main menu 1002. In response to an instruction from the operator, the design/evaluation support tool 100 performs processes at steps 902 to 906 that will be described later.

Figure 10:
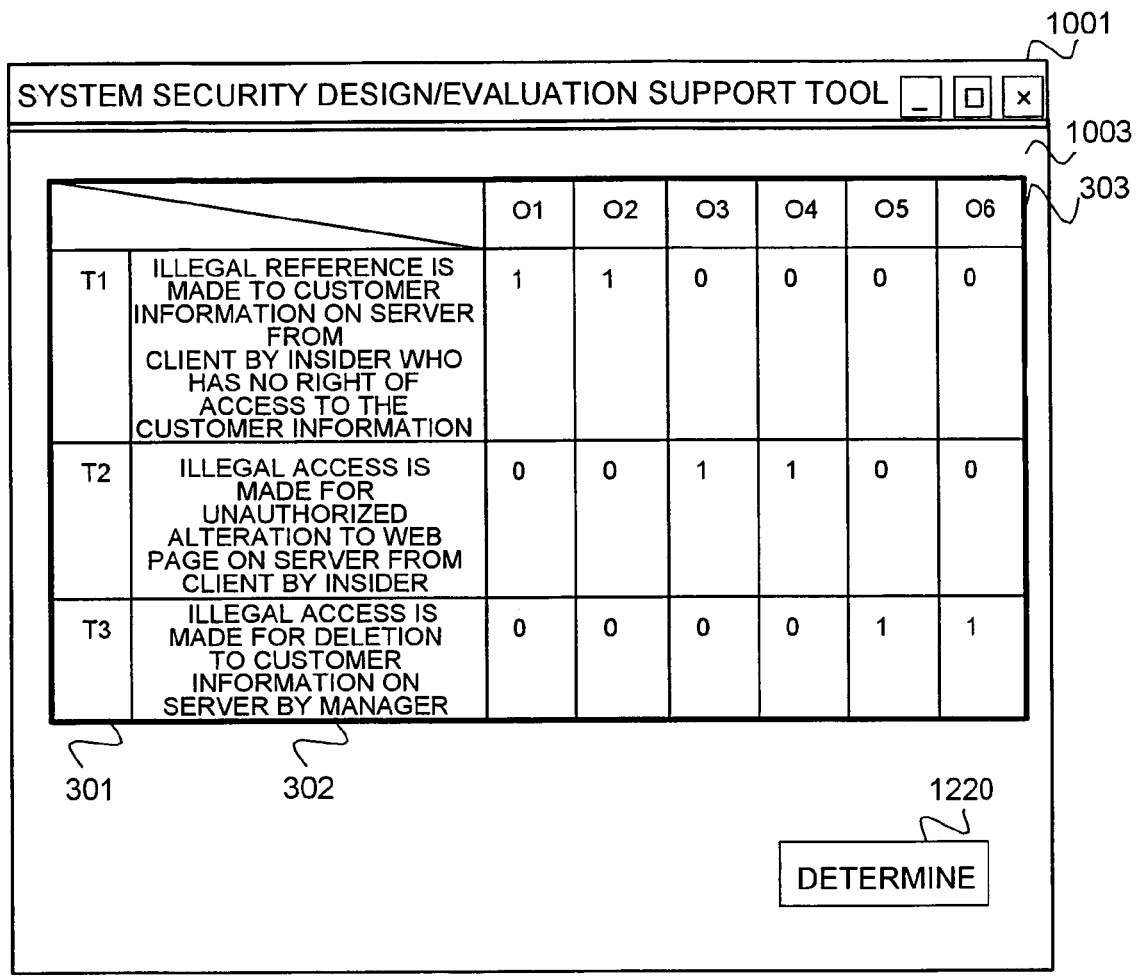
FIG. 10 is a diagram of an example of a screen accepting setting of a threat-to-component correspondence table.

When "Derive component assurance level" 1011 of the submenu is designated by the operator using the input device 105 such as a mouse, the user interface processing unit 113 of the design/evaluation support tool 100 first outputs a screen accepting threat-to-component correspondence settings as shown in FIG. 10 by way of example to the display 104, etc. Although FIG. 10 shows only the screen for the entry of correspondence between threats and security objectives on account of space limitations, all the threat-to-component correspondence data are actually allowed to be entered. The operator enters via this screen the information on threats, security objectives, functional requisites, and components, and correspondences therebetween.

When a determination button 1220 is pressed after completion of the entry by the operator, the user interface processing unit 113 of the design/evaluation support tool 100 stores the entry-accepted information on threats, security objectives, functional requisites, and components, and correspondences therebetween into the threat-to-component correspondence table 125 and proceeds to the next step (S902).

Figure 11:
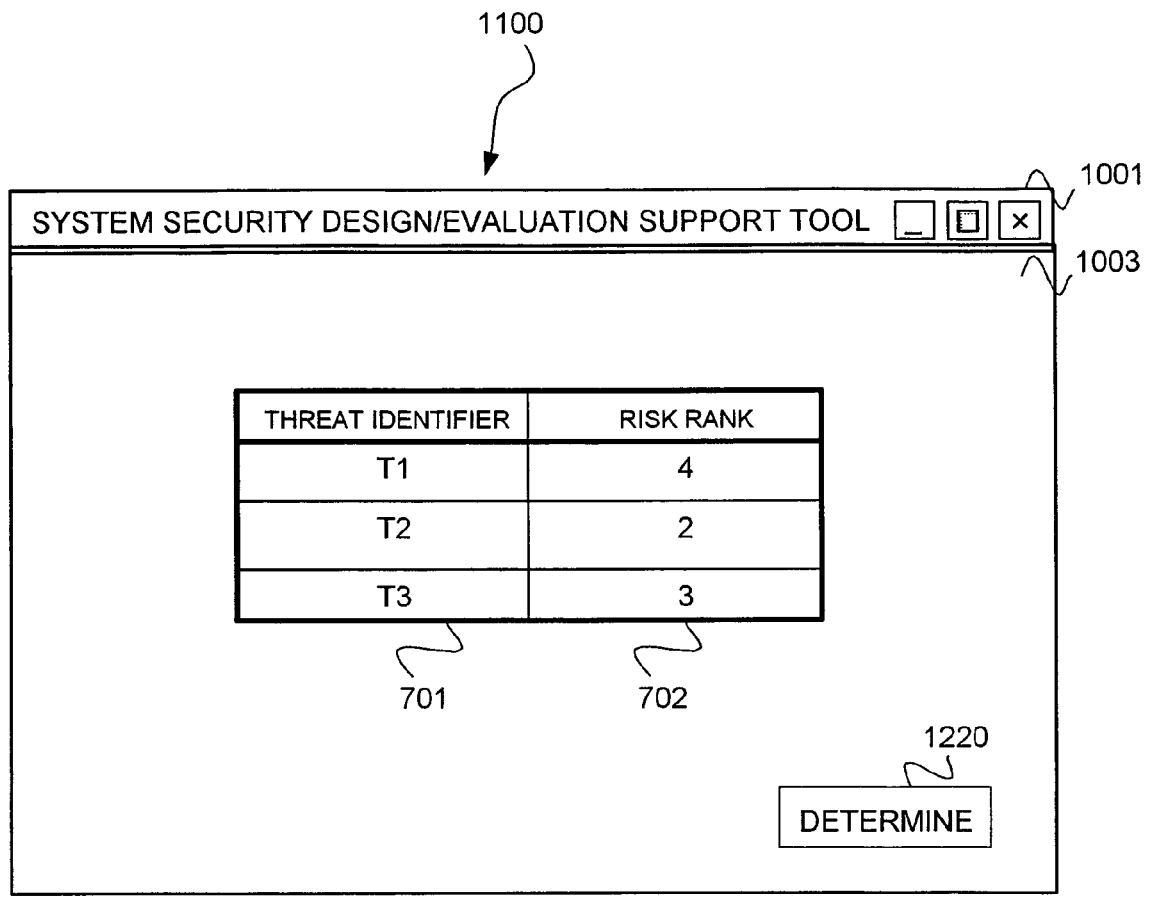
FIG. 11 is a diagram of an example of a screen accepting setting of risk ranks of threats.

The user interface processing unit 113 of the design/evaluation support tool 100 then outputs a screen 1100 accepting settings of risks of threats as shown in FIG. 11 by way of example to the display 104, etc. The operator enters risk ranks of the threats through the screen 1100. When the determination button 1220 is pressed after completion of the entry by the operator, the user interface processing unit 113 of the design/evaluation support tool 100 stores the entry-accepted information on the risk rank for each of the threats into the risk-value table 126 and proceeds to the next step (S903).

The risk ranks entered are ones obtained by classifying the magnitudes of risks of the threats into several ranks on the basis of the results of risk analyses effected by the designer or the evaluator. Examples obtaining qualitative risk ranks through the risk analyses will be described with reference to FIGS. 12 to 16.

Figure 12:
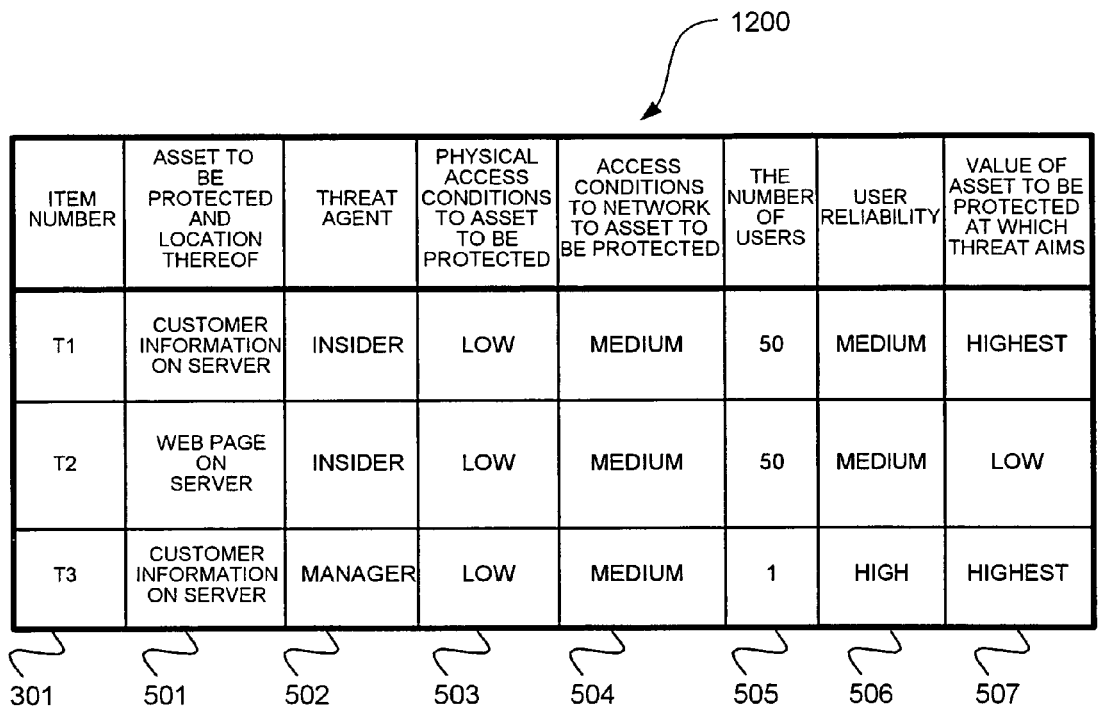
FIG. 12 is a diagram of case 1 for an operator to determine risk ranks based on risk analyses.

FIG. 12 shows a table 1200 indicative of examples of data required to calculate a risk rank for each threat. In the table 1200, a column 301 represents identifiers of threats, a column 501 represents assets to be protected at which threats aim and locations thereof, a column 502 represents threat agents causing threats, a column 503 represents conditions of physical accesses to the assets to be protected, a column 504 represents conditions of physical accesses to a network to the assets to be protected, a column 505 represents the number of users, a column 506 represents reliabilities of users, and a column 507 represents the magnitudes of influences that a management organization of a subject system suffers depending on the values of assets to be protected at which the threats aim.

Figure 13A:
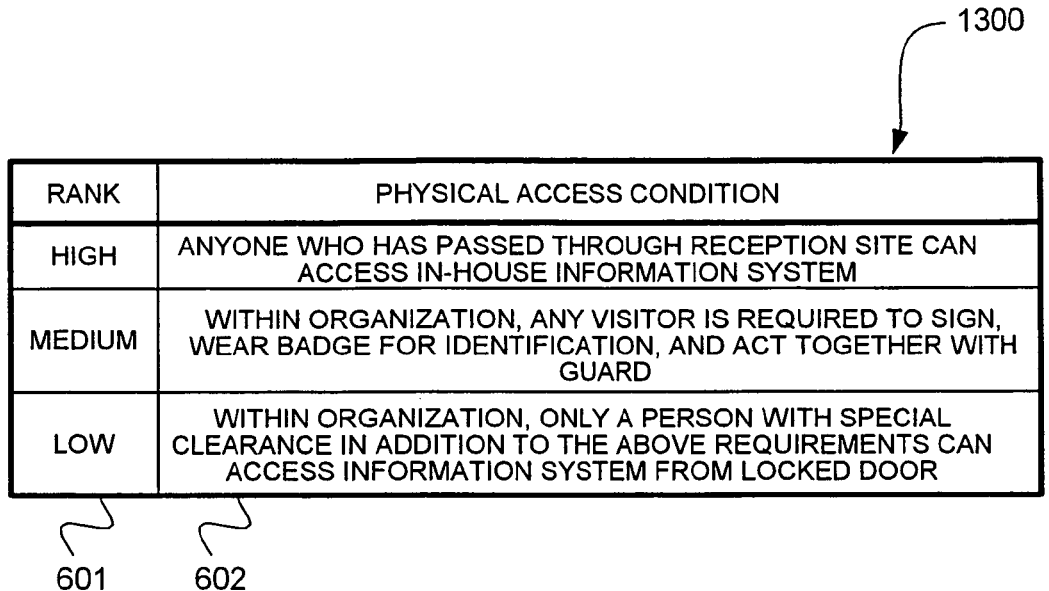
FIGS. 13A and 13B are diagrams of case 2 for the operator to determine risk ranks based on risk analyses.

The conditions of physical accesses to the assets to be protected are set to three stages (high, medium, low) indicated as ranks in a column 601 of a table 1300 of FIG. 13A. Specifically, the setting is made depending on to which condition the physical access condition to a user asset to be protected applies among physical access conditions shown in a column 602.

Figure 13B:
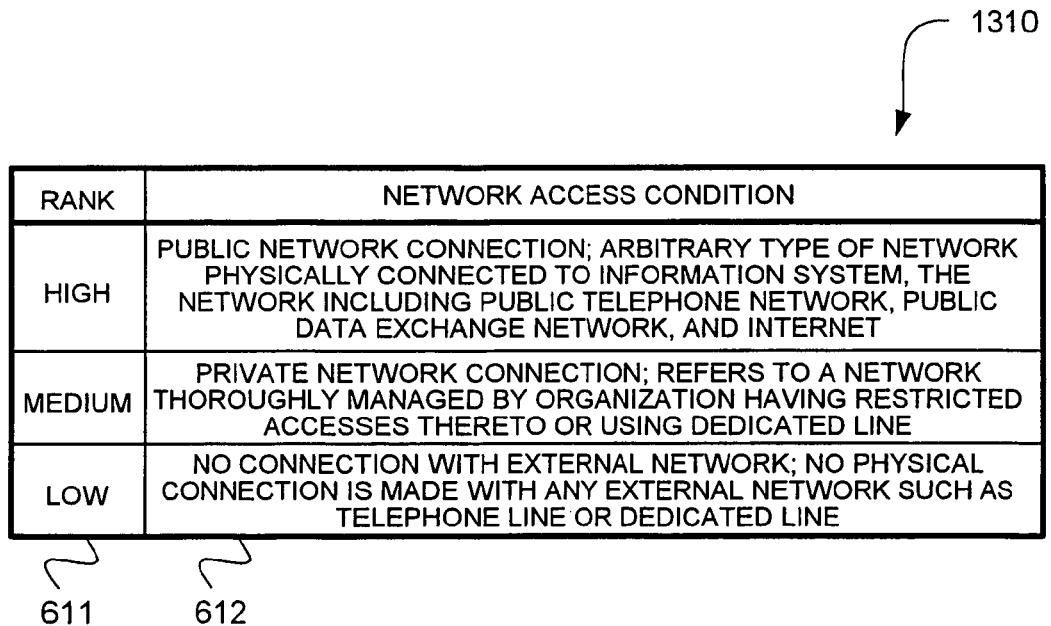

The conditions of network accesses to the assets to be protected are set to three stages (high, medium, low) indicated as ranks in a column 611 of a table 1310 of FIG. 13B. Specifically, the setting is made depending on to which condition the network access condition to a user asset to be protected applies among network access conditions shown in a column 612.

The user reliabilities are set to four stages (HIGHEST, high, medium, low) indicated as ranks in a column 701 of a table 1400 of FIG. 14A. Specifically, the setting is made depending on to which condition the user reliability applies among the contents of user reliabilities shown in a column 702.

The magnitudes of influences that a management organization of the subject system 200 suffers due to threats are set to four stages (HIGHEST, high, medium, low) indicated as ranks in a column 711 of a table 1410 of FIG. 14B. Specifically, the setting is made depending on to which condition the magnitude of the influence that the management organization of the subject system 200 suffers due to a threat applies among the contents of the influences that the management organization suffers shown in a column 712.

FIG. 15A is a diagram of a correspondence table 1500 of accessibility obtained from physical access conditions and network access conditions. In the table 1500, a column 801 represents ranks of physical access conditions, and a row 802 represents ranks of network access conditions. A matrix portion represents ranks of accessibilities obtained from the ranks of the physical access conditions and the ranks of the network access conditions. Specifically, when the physical access condition is "medium" with the network access condition being "high" for example, the accessibility becomes "high".

FIG. 15B is a diagram of a correspondence table 1510 of the magnitude of vulnerability obtained from the number of users and the accessibility. In the table 1501, a column 811 represents ranges of the numbers of users, and a row 812 represents ranks of the accessibilities. A matrix portion represents the magnitudes of the vulnerabilities obtained from the ranges of the numbers of users and the ranks of the accessibilities. Specifically, when the number of users is 50 (the range of the number of users is "2 to 100") with the rank of accessibility being "high" for example, the rank of the vulnerability becomes "medium".

FIG. 15C is a diagram of a correspondence table 1520 of risk ranks obtained from the rank of influence that a management organization suffers, the rank of vulnerability, and the rank of user reliability. In the table 1520, a column 821 represents ranks of the influences that the management organization suffers, a row 822 represents ranks of the magnitudes of vulnerabilities, and a row 823 represents ranks of user reliabilities. A matrix portion represents risk ranks obtained from the ranks of influences that the management organization suffers, the ranks of the magnitudes of vulnerabilities, and the ranks of user reliabilities. Specifically, when the rank of the influence that the management organization suffers is "high" with the rank of the magnitude of vulnerability being "medium" and with the rank of the user reliability being "low" for example, the risk rank becomes "4".

The designer or the evaluator of the subject system 200 prepares data required to set the risk ranks as shown in FIG. 12, and finds a risk rank for each threat using the correspondence tables of FIGS. 15A to 15C.

Description will be made of the risk rank of the threat "T1" of FIG. 12 by way of example. The threat T1 has the physical access condition set to "low", the network access condition of "medium", the number of agents of "50", the agent reliability of "medium" and the magnitude of the value of the asset to be protected at which the threat aims being set to "HIGHEST". Thus, the accessibility of the threat T1 becomes "low" from correspondence of FIG. 15A. Next, the magnitude of the vulnerability becomes "low" from correspondence of FIG. 15B. Finally, the risk rank of the threat T1 results in "4" from correspondence of FIG. 15C.

The method of preparing the risk ranks of threats is not limited to the above examples, and the risk ranks may be found using other analysis methods. Generally, the magnitude of the risk is determined from two factors, i.e., the magnitude of the value of the asset to be protected from a threat and the possibility of occurrence of the threat. Although in the above risk rank examples the risk rank is determined using the factors of the items 503 to 507 in the table 1200 of FIG. 12, the items 503 to 506, the magnitude 822 of the vulnerability obtained from FIGS. 15A and 15B, and the user reliability are relevant to the possibility of occurrence of the threat (higher vulnerability and lower user reliability will result in a higher possibility of occurrence of the threat), and the item 507 is the magnitude itself of the value of the asset to be protected. This means that the risk rank is figured out based on the essentially the same factors. The method of calculating the risk rank is not limited to the method of this embodiment, and the other method would also be available as long as it is a risk rank calculation method making determination with two factors, i.e., the magnitude of the value of the asset to be protected from a threat and the possibility of occurrence of the threat.

The risk analysis may be performed by the designer of the subject system 200 or may be performed by the evaluator. In case the designer determines the risk ranks while the evaluator makes evaluation using this tool, the evaluator acquires the contents of the risk analysis effected by the designer in the form of documents, etc., and verifies the contents of this risk analysis previous to the entry of the risk ranks.

It is to be noted that the table link use unit 110 covers the process of identifying a linkage among the various types of tables of this embodiment (nesting structure of the table items) based on their mutually duplicate items.

Figure 16:
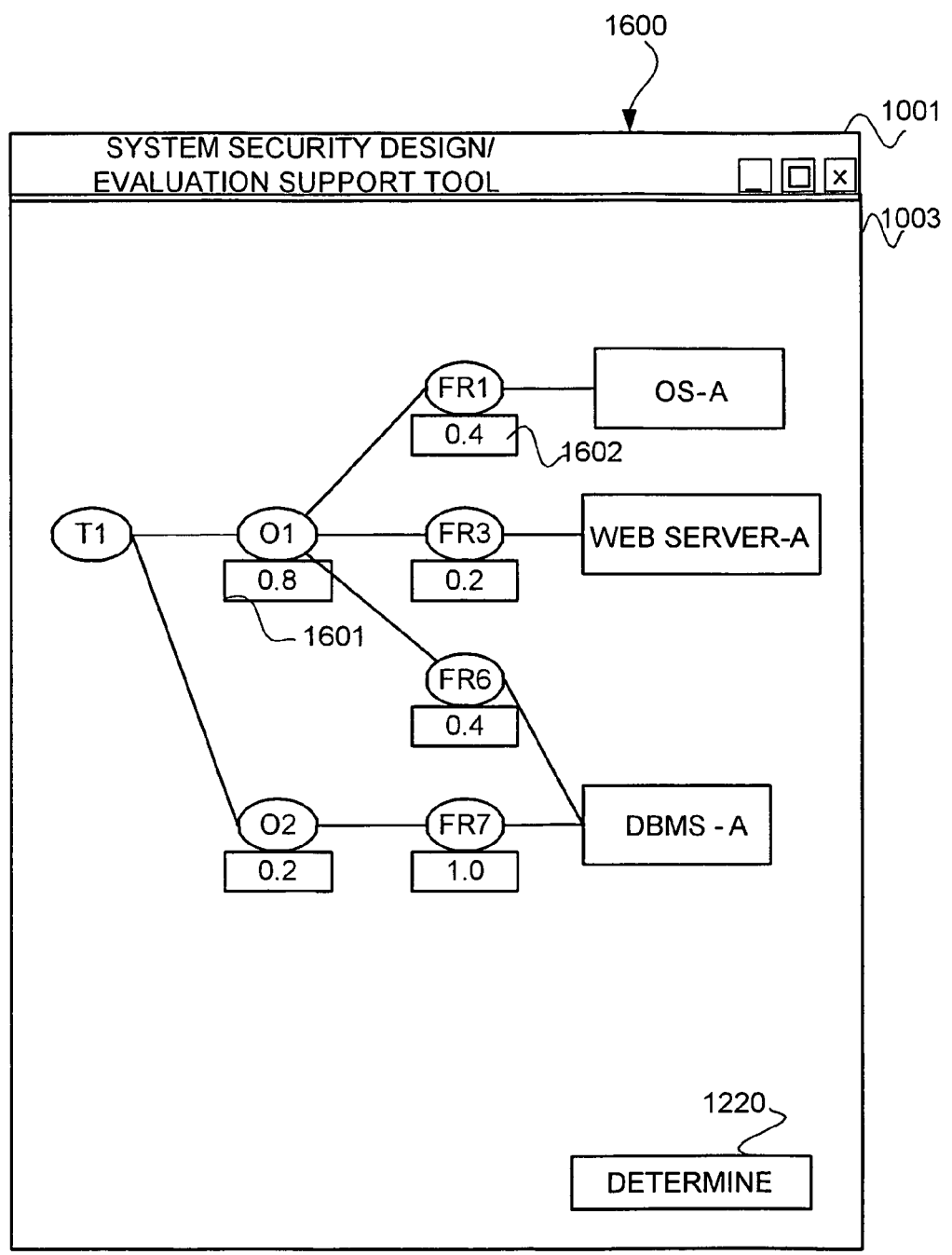
FIG. 16 is a diagram of an example of a screen accepting setting of data required for calculation of rates of contribution.

The design/evaluation support tool 100 then outputs to the display 104, etc., a screen 1600 accepting the settings of rates of contribution of components corresponding to the threats as shown in FIG. 16 by way of example. Through the screen, the operator enters a rate 1601 of contribution of the security objective to the threat and a rate 1602 of contribution of the functional requisite to the security objective. When the operator completes the entry and presses the determination button 1220, the user interface processing unit 113 of the design/evaluation support tool 100 stores the rate of contribution of the security objective to the threat and the rate of contribution of the functional requisite corresponding to the security objective into the component contribution rate table 127, and transfers the process to the component assurance level deriving unit 111 to proceed to the next step (S904).

In case the evaluator accepts and enters information on rates of contribution designed by the designer at designing, the evaluator verifies the rates of contribution set by the designer from the viewpoint of the third person, and if any defect is present, modifies the rates of contribution previous to the entries.

Using the threat-to-component correspondence table 125, the risk-value table 126, the component contribution rate table 127, the risk-to-assurance level correspondence table 128 that are stored in the steps 902 to 904, the component assurance level deriving unit 111 of the design/evaluation support tool 100 then derives the component assurance levels (S905).

Figure 17:
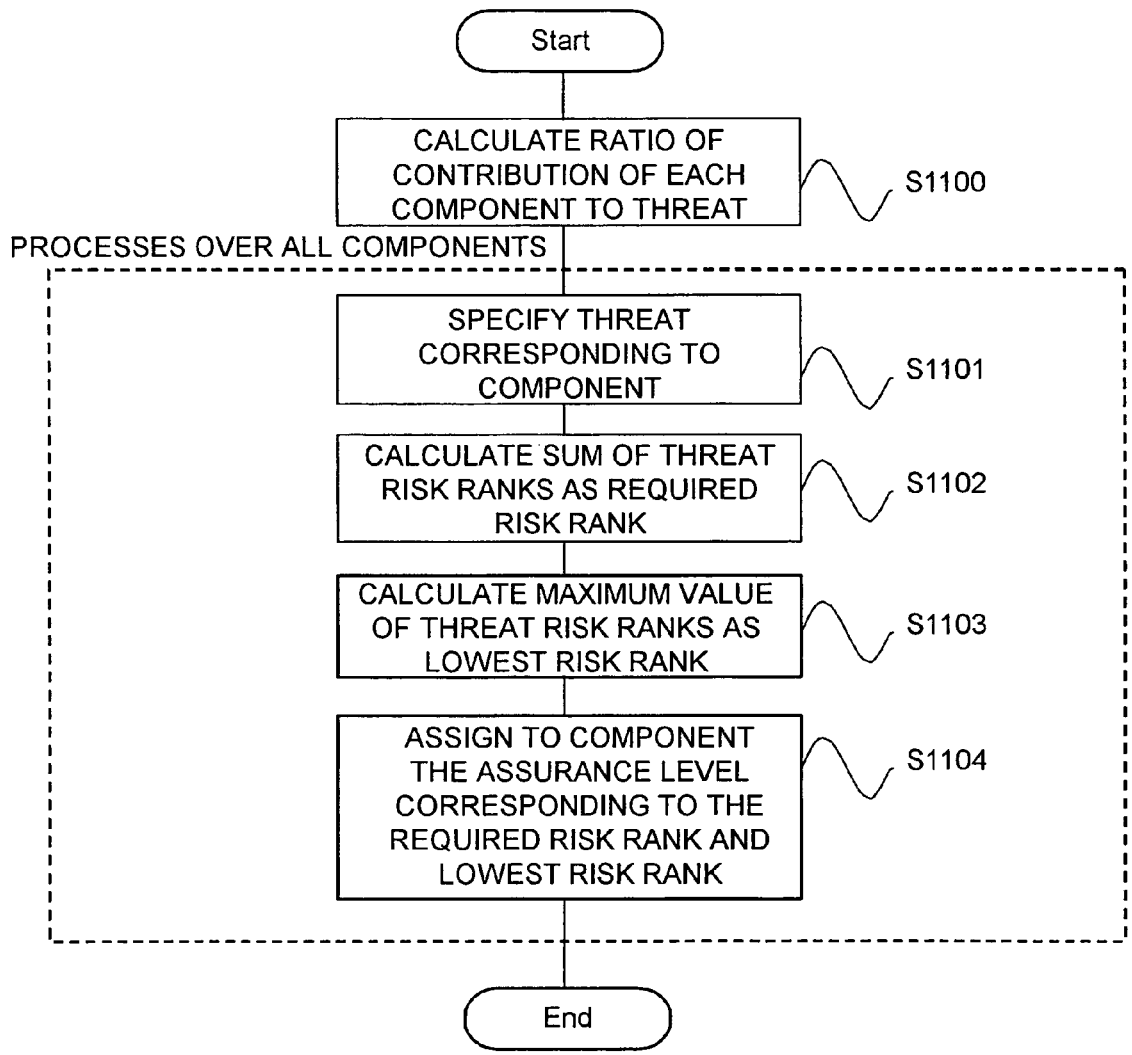
FIG. 17 is a flowchart of a procedure of deriving the component assurance levels.
Figure 18:
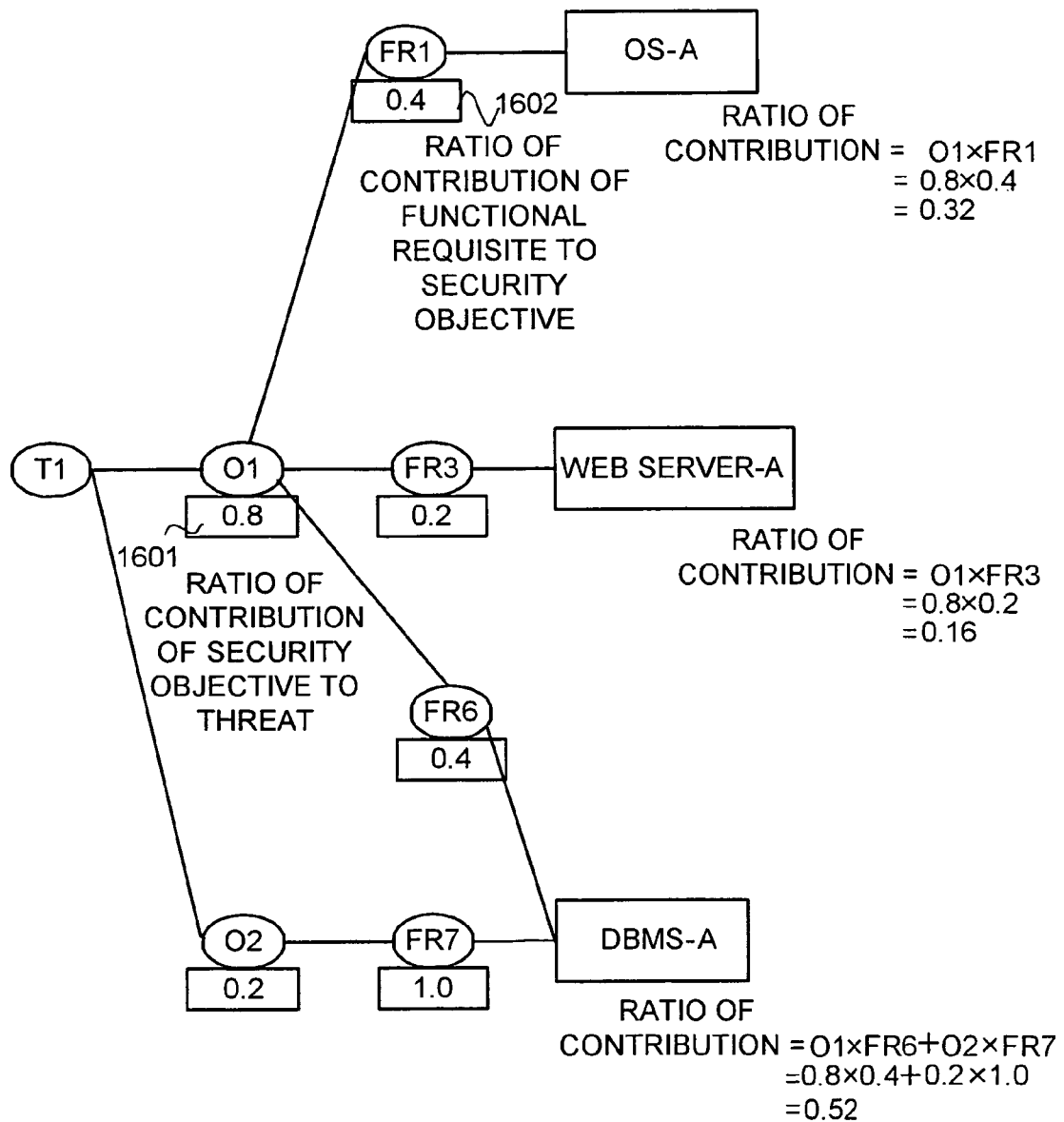
FIG. 18 is an image diagram of a concept calculating the rate of contribution of the component to a threat.

A specific process flow of the above steps will be described with reference to a flowchart of FIG. 17. First of all, the rates of contribution of components to threats are calculated using data of the component contribution rate table 127 stored at the step 904 (S100). This process is covered by the contribution rate calculating unit 112. Specifically, the contribution rate calculating unit 112 identifies security objectives corresponding to threats, functional requisites, and components, and in the respective correspondence, multiplies the rate 1601 of contribution of the security objective to the threat (see FIG. 16) and the rate 1602 of contribution corresponding to the security objective (see FIG. 16), and adds up the products for each of the components to obtain the rate of contribution of the component to the threat.

Referring to FIG. 16, description will be made of calculation of the rate of contribution of "DBMS-A" to the threat "T1" of the subject system 200 by way of example. The threat T1 and the DBMS-A have (1) correspondence through "01"-"FR6" and (2) correspondence through "02"-"FR7". In this correspondence, the rate of contribution of the security objective to the threat and the rate of contribution corresponding to the security objective are multiplied together to obtain (1) "0.8×0.4=0.32" and (2) "0.2×1.0=0.2". (1) and (2) add up to "0.52", which is the rate of contribution of the DBMS-A corresponding to the threat T1. In the same manner, the rate of contribution of the OS-A is "0.32" and the rate of contribution of the WEB server-A is "0.16".

The design/evaluation support tool 100 then performs the processes shown at steps 1101 to 1104 for all the components having correspondence with the threats. In this case, the design/evaluation support tool 100 first refers to the threat-to-component correspondence table 125 to identify a threat corresponding to the component (S1101).

The design/evaluation support tool 100 then sums the risk ranks of the corresponding threats, and provides the sum as a REQUIRED risk rank of the component (S1102). The design/evaluation support tool 100 calculates the maximum value of the risk ranks of the corresponding threats and provides the maximum as the lowest risk rank of the component (S1103).

Another method of calculating the lowest risk rank may be achieved by calculating, as the lower risk rank, the risk rank of the threat the rate of contribution of the component to which becomes maximum.

Using the risk-to-assurance level correspondence table 128, the design/evaluation support tool 100 then derives the assurance level corresponding to the REQUIRED risk rank as a REQUIRED assurance level of the component. The design/evaluation support tool 100 derives similarly the assurance level corresponding to the lowest risk rank as the lowest assurance level of the component (S1104).

The processes at the steps 1101 to 1104 will be described for the WEB server-A as a subject example. First of all, the design/evaluation support tool 100 identifies T1 and T2 that are threats corresponding to the WEB server-A based on the threat-to-component correspondence table 125 (S1101). The design/evaluation support tool 100 then refers to a risk-value table 1263 and recognizes the risk ranks of T1 and T2 to be "4" and "2", respectively, the sum "6" of which is provided as the REQUIRED risk rank of the WEB server-A (S1102).

The design/evaluation support tool 100 recognizes similarly the risk ranks of the threats "T1" and "T2" to be "4" and "2", the maximum value of which is provided as the lowest risk rank of the WEB server-A (S1103).

Finally, using the risk-to-assurance level correspondence table 128, the design/evaluation support tool 100 derives the assurance level "6" corresponding to the REQUIRED risk rank "6" as the REQUIRED assurance level and derives the assurance level "4" corresponding to the lowest risk rank "4" as the lowest assurance level (S1104).

After derivation of the REQUIRED assurance level and the lowest assurance level of each component through the above procedure, the design/evaluation support tool 100 allows the user interface processing unit 113 to display in the form of a table 1900 the assurance level required for each component and the assurance levels of actually selected products or newly developed parts as shown in FIG. 19 at step 906 of FIG. 8, after which control returns to step 901 (S906). A column 1901 of the table 1900 represents component names, a column 1902 represents assurance levels REQUIRED (range between the REQUIRED assurance level and the lowest assurance level), and a column 1903 represents the assurance levels of the selected products or newly developed parts.

Thus, the operator of this design/evaluation support tool 100 can easily compare proper assurance levels of components making up the subject system 200 with assurance levels of the actually selected products or newly developed parts and determine components having no proper assurance levels.

Second Embodiment

A second embodiment of the present invention will now be described with reference to the drawings. This embodiment is a variant of the method of deriving the assurance levels of components according to the first embodiment. Therefore, description will be made hereat of only the derivation of assurance levels of components and of only altered portions in comparison with the first embodiment.

Figure 20:
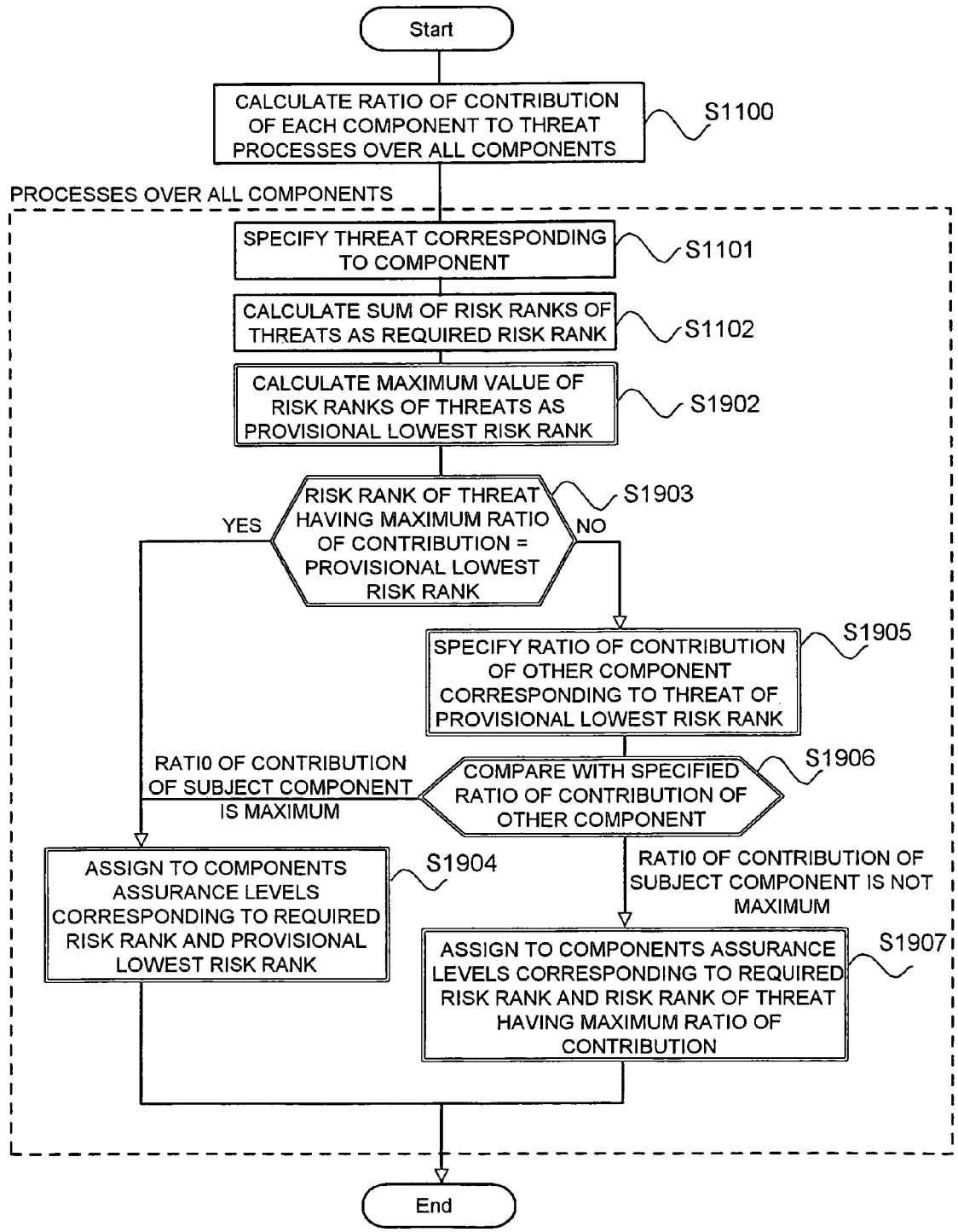
FIG. 20 is a flowchart of a procedure of deriving component assurance levels according to a second embodiment.

FIG. 20 is a flowchart of deriving component assurance levels. Specifically, a specific process flow is shown of the step 905 of FIG. 8 used for the description of the first embodiment. The steps 1100 to 1102 are the same as those of the first embodiment. Therefore, only the steps 1902 to 1907 will be described.

The design/evaluation support tool 100 first calculates the maximum value of risk ranks of threats corresponding to the components as a provisional lowest risk rank (S1902). The design/evaluation support tool 100 then compares the risk rank of a threat having maximum rate of contribution corresponding to the components with the calculated provisional lowest risk rank, and if the two are equal, then control proceeds to step 1904, whereas if the two are not equal, then control proceeds to step 1905 (S1903).

Using the risk-to-assurance level correspondence table 128, the design/evaluation support tool 100 at step 1904 derives an assurance level corresponding to the REQUIRED risk rank as the REQUIRED assurance level and derives an assurance level corresponding to the provisional lowest risk rank as the lowest assurance level (S1904). The design/evaluation support tool 100 at step 1905 identifies the rates of contribution of other components corresponding to the threat of the provisional lowest risk rank.

The design/evaluation support tool 100 then compares the rate of contribution of a subject component with the rates of contribution of the other components identified at the step 1905, and if the subject component has a maximum rate of contribution, then control proceeds to step 1904, but otherwise, control proceeds to step 1907 (S1906).

The design/evaluation support tool 100 then derives assurance levels corresponding to the REQUIRED risk rank and a risk rank having a maximum rate of contribution as a REQUIRED assurance level and a lowest assurance level, respectively (S1907).

The processes at the steps 1101 and 1102, and the steps 1902 to 1907 will be described in terms of the WEB server-A as a subject example. First of all, the design/evaluation support tool 100 identifies threats "T1" and "T2" corresponding to the WEB server-A from the threat-to-component correspondence table 125 (S101). The design/evaluation support tool 100 then refers to the risk-value table 126 and recognizes the risk ranks of the threats "T1" and "T2" to be "4" and "2", respectively, the sum "6" of which is provided as the REQUIRED risk rank of the WEB server-A (S1102).

The design/evaluation support tool 100 then recognizes the risk ranks of the threats "T1" and "T2" to be "4" and "2", respectively, the maximum "6" of which is provided as the provisional lowest risk rank of the WEB server-A (S1902).

Due to the rates of contribution of the WEB server-A to the threats T1 and T2 being 0.16 and 0.68, respectively, from the data of FIG. 6C on the rates of contribution of the components to the threats, the design/evaluation support tool 100 identifies T2 as a threat having a maximum rate of contribution, and compares the risk rank "2" of the threat T2 having a maximum rate of contribution with the REQUIRED risk rank "4" from correspondence between the threats and the risk ranks of FIG. 5 (S1903). Since the two are not equal, control proceeds to step 1905.

The design/evaluation support tool 100 then identifies "OS-A" (rate of contribution: 0.32) and "DBMS-A" (rate of contribution: 0.52) as the rates of contribution of other components corresponding to the threat "T1" having a highest risk rank of FIG. 6C (S1905), and compares them with the rate of contribution "0.16" of the WEB server-A (S1906). Since the DBMS-A has a maximum rate of contribution, control goes to step 1907.

The design/evaluation support tool 100 finally derives the REQUIRED risk rank "6" as the REQUIRED assurance level and derives the risk rank "2" of the threat "T2" having a maximum rate of contribution as the lowest assurance level (S1907).

The above enables the assurance levels of components conforming to the magnitudes of the risks of threats to be derived in consideration of the rates of contribution of the components to the threats.

Third Embodiment

A third embodiment of the present invention will now be described with reference to the drawings. This embodiment is a variant that represents the magnitudes of risks as being quantitative, different from the first embodiment representing the magnitudes of risks qualitatively. Only the modified portion to the first embodiment will be described hereinbelow.

FIG. 21A shows a variant of the risk-value table 126 of the design/evaluation support tool 100. The column 301 of this table 126 represents identifiers of threats similar to the first embodiment, and a column 2001 represents the risk values of the threats. Unlike the first embodiment, the magnitudes of the risks are represented as quantitatively comparable values such as (the amount of damage caused by occurrence of a threat)×(the possibility of occurrence of a threat). In FIG. 21A, the above risk values are indicated by (ten-thousand-yen×times/year).

FIG. 21B shows a variant of the risk-to-assurance level correspondence table 128 of the design/evaluation support tool 100. In this table 128, a column 2002 represents risk values and a column 702 represents assurance levels corresponding to the risk values.

Figure 22:
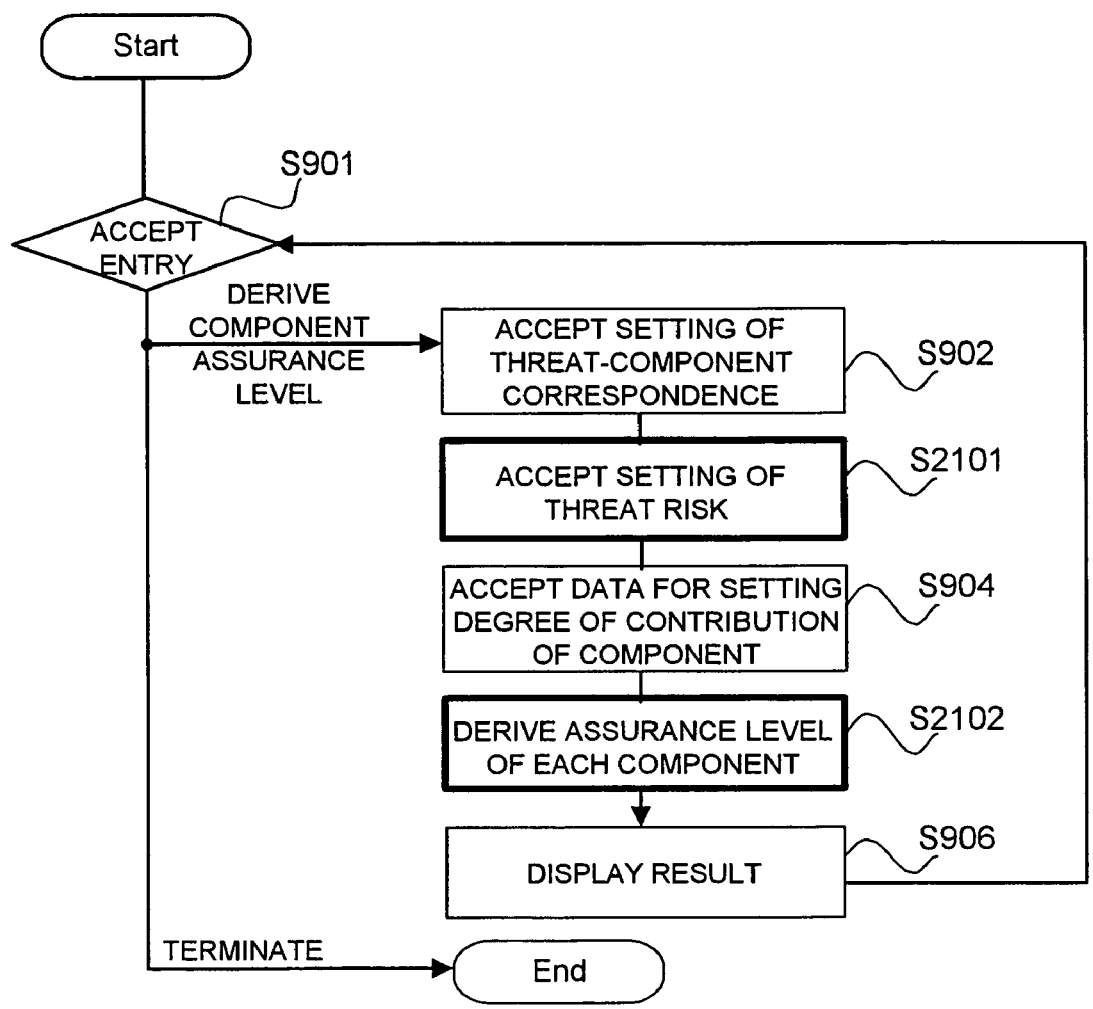
FIG. 22 is a flowchart of tool operation in a system security design/evaluation support method of the third embodiment.

FIG. 22 is a flowchart of a procedure of the design/evaluation support tool 100 in the system security design/evaluation support method. In this flow, steps 901, 902, 904, and 906 are the same as those of the first embodiment. Therefore, only the steps 2101 and 2102 will be described below.

Figure 23:
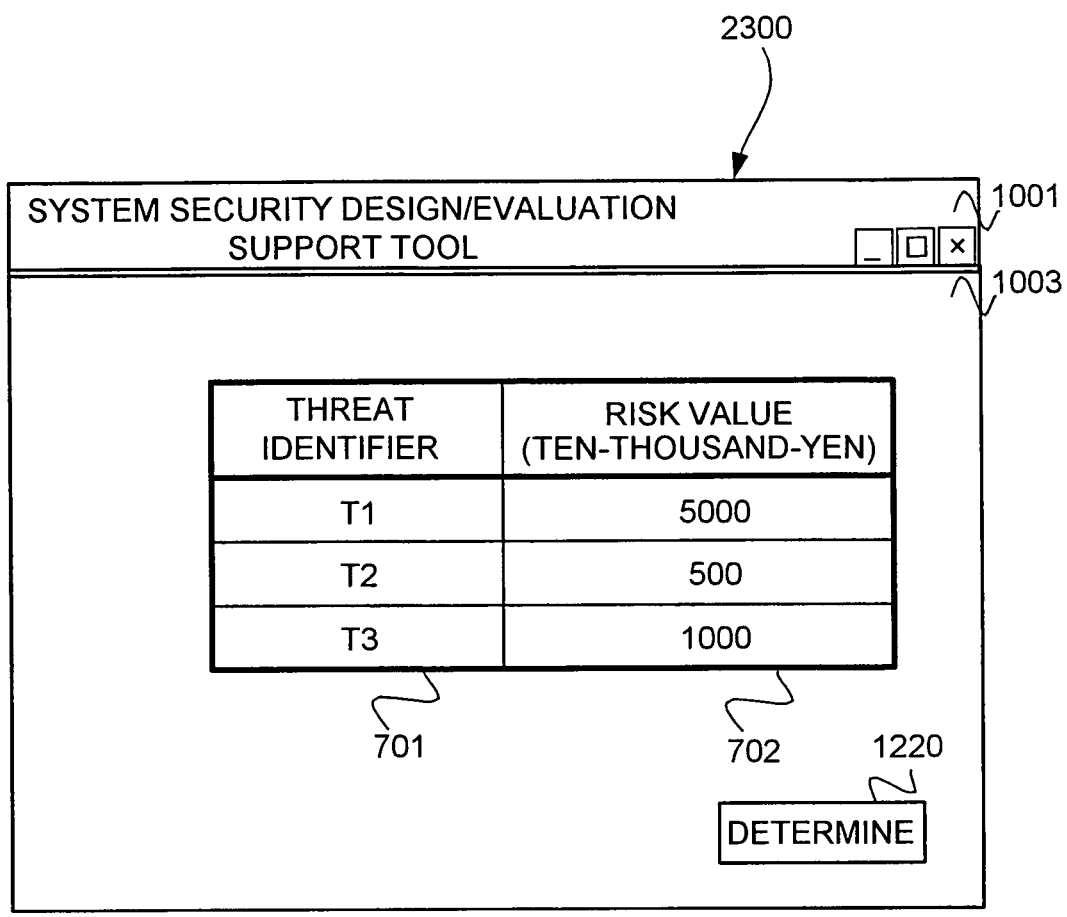
FIG. 23 is a diagram of an example of a screen setting a risk value of a threat according to the third embodiment.

At the step S2101, the user interface processing unit 113 of the design/evaluation support tool 100 outputs to the display 104, etc., a screen 2300 accepting the setting of the risk-value table 126 as shown in FIG. 23 by way of example.

The operator enters the risk values of threats of the risk-value table 126 through the screen 2300. When the operator completes the entry and presses the determination button 1220 on the screen 2300, the user interface processing unit 113 stores information of the entered risk value for each threat into the risk-value table 126 and allows control to proceed to the next step (S2101).

The above risk values are risk values of threats that are entered based on the results of risk analyses effected by the designer or the evaluator. An example of finding the quantitative risk values by the risk analyses will be described with reference to FIG. 24.

FIG. 24 shows a table 2400 indicative of examples of data required to calculate a risk value for each of threats and examples of the resultant risk values. In the table 2400, a column 301 represents identifiers of threats, a column 2301 represents the amount of damage caused by occurrence of a threat, a column 2302 represents the possibility of occurrence of a threat, and a column 2303 represents risk values of threats obtained from the columns 2301 and 2302. Although the unit of the amount of damage is "ten-thousand-yen" and the unit of the possibility of occurrence of a threat is "times/year" by way of example, other standards may be employed as long as the values are comparable quantitatively. The case of the threat "T1" will be described as a specific example. With the amount of damage caused by occurrence of the threat T1 being "1000" ten-thousand yen and with the possibility of occurrence of the threat being "5" times/year, the risk value of the threat T1 results in 1000×5="5000".

Figure 25:
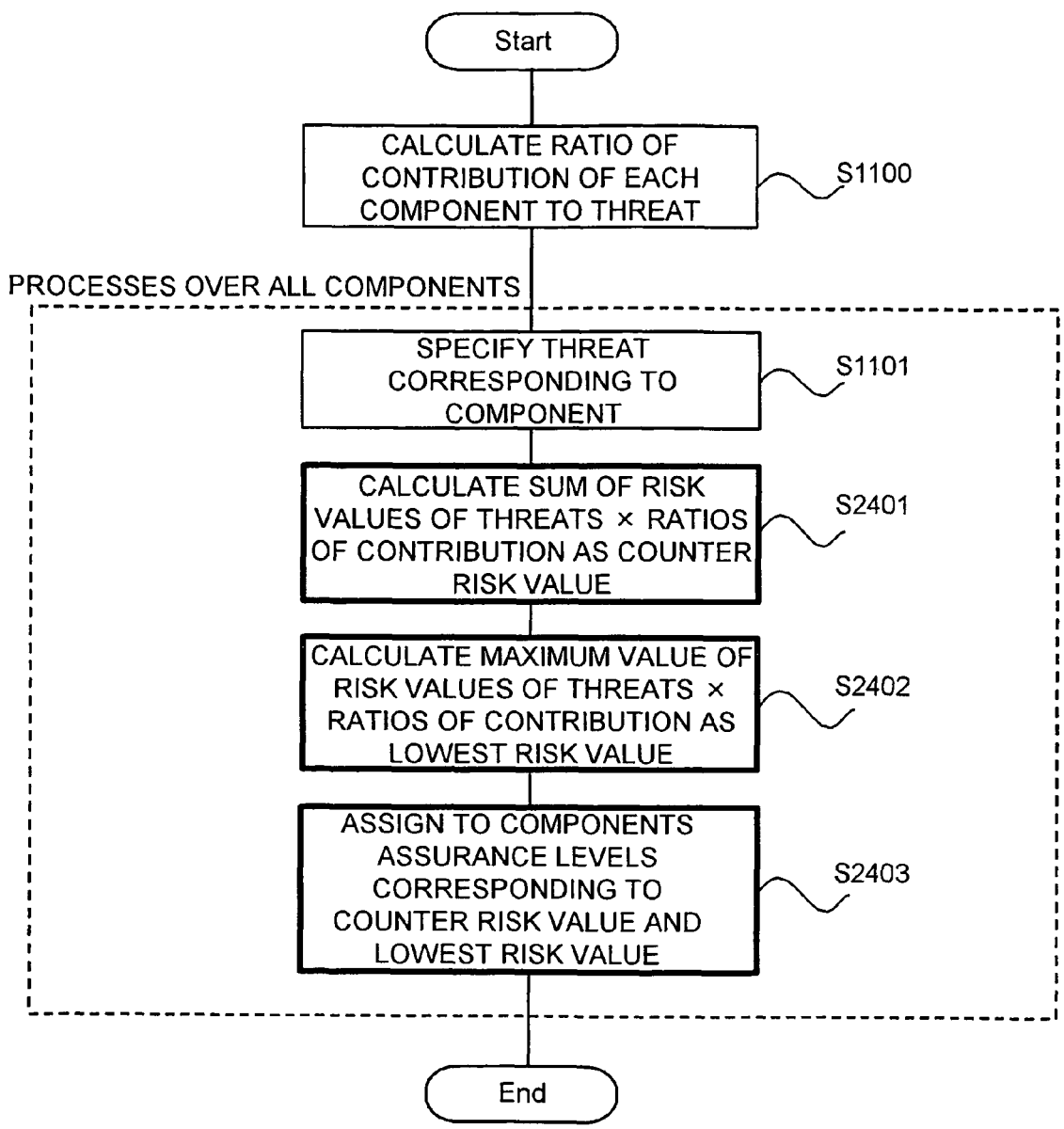
FIG. 25 is a flowchart of a procedure deriving component assurance levels according to the third embodiment.

Next, at step 2102, the component assurance level deriving unit 111 derives an assurance level for each component. A specific process flow of this step will be described with reference to a flowchart of FIG. 25. The steps 1100 and 1101 are the same as those of the first embodiment. Therefore, only the steps 2401 to 2403 will be described.

First, the design/evaluation support tool 100 sums products of the risk values of corresponding threats and the rates of contribution of components, to obtain a counter risk value of the components (S2401).

The design/evaluation support tool 100 then takes the maximum value of products of the risk values of threats and the corresponding rates of contribution of components, to obtain a lowest counter risk value of the components, or according to another method of obtaining a lowest counter risk value, takes the minimum value of products of the risk values of the threats and the corresponding rates of contribution of components, to obtain a lowest counter risk value of the components (S2402). Using the risk-to-assurance level correspondence table 128, the design/evaluation support tool 100 derives an assurance level corresponding to the counter risk value as the REQUIRED assurance level of the component and derives an assurance level corresponding to the lowest counter risk value as the lowest assurance level of the component (S2403).

The processes of the steps 1101, and 2401 to 2403 will be described in terms of the "WEB server-A" by way of example. First of all, the design/evaluation support tool 100 identifies threats "T1" and "T2" corresponding to the WEB server-A from the threat-to-component correspondence table 125 (S1101). The design/evaluation support tool 100 then refers to the risk-value table 126 to recognize the risk values of the threats "T1" and "T2" to be "5000" and "500", respectively. The design/evaluation support tool 100 further refers to the component contribution rate table 127 to recognize the rates of contribution of the WEB server-A to the threats "T1" and "T2" to be "0.16" and "0.68", respectively. Since "the risk value of threat×the rate of contribution" is "5000×0.16=800" and "500×0.68=340" for the threats "T1" and "T2", respectively, the design/evaluation support tool 100 calculates the sum thereof to obtain "1140" as the counter risk value of the WEB server-A (S2401).

The design/evaluation support tool 100 then calculates the maximum value of products "the risk values of threats×the rates of contribution" as the lowest counter risk value of the WEB server-A to obtain "800" (S2402). Using the risk-to-assurance level correspondence table 128, the design/evaluation support tool 100 finally derives an assurance level "4" corresponding to the counter risk value as the REQUIRED assurance level and derives an assurance level "3" corresponding to the lowest counter risk value as the lowest assurance level (S2404).

Thus, by finding the degree of risk reduction for each of the components as quantitative amounts using the quantitative threat risk values and rates of contribution, proper assurance levels can be derived that depend on the degree of risk reduction and that is required of the components.

Fourth Embodiment

A fourth embodiment of the present invention will now be described with reference to the drawings. This embodiment is a variant that presents an optimum product or an optimum combination of products with use of the method of deriving assurance levels of components, described in the first embodiment, so as to support the selection of products forming a system when designing system security. Accordingly, only part different than in the first embodiment will be described below.

Assume that in the above designing of system security, while one or more subsystems, functional units of a system, have been defined as constituent elements to achieve the objective of the system, a component or components (a product or a combination of plural products) to actually realize the subsystems are not yet decided. This embodiment describes an example where as components to realize the subsystems, an optimum product or an optimum combination of products is derived from plural product candidates and that information is presented to an operator.

Figure 26:
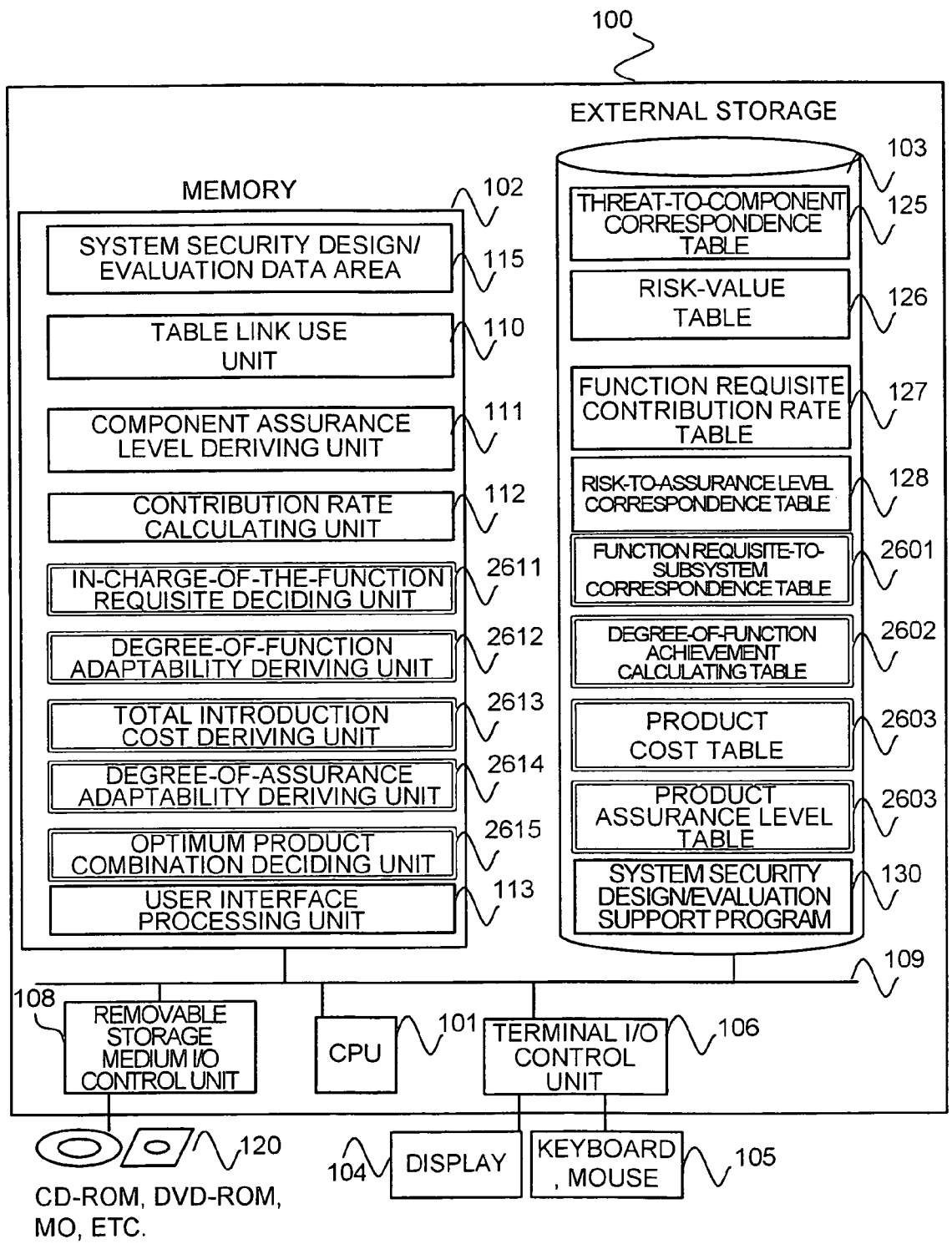
FIG. 26 is a modified example schematic configuration diagram of a system security design/evaluation support tool according to a fourth embodiment.

FIG. 26 shows the configuration of a system security design/evaluation support tool according to the embodiment. In FIG. 26, the system security design/evaluation support tool 100 (hereinafter called a design/evaluation support tool 100) stores a function requisite-to-subsystem correspondence table 2601, a degree-of-function achievement calculating table 2602, a product cost table 2603, and a product assurance level table 2603 (denoted by the same reference numeral assuming being integral with the product cost table) in the external storage device 103 in addition to those of the first embodiment.

A system security design/evaluation support program 130 stored in the external storage device 103 is a program that further implements, as compared with that of the first embodiment, an in-charge-of-the-function requisite deciding unit 2611 that decides which products are to be in charge of function requisites, according to an in-charge-of-the function requisite rule which decides a system function requisite that the security function of each product is to be in charge of, so as to minimize the assurance level of a product constituting each component; a degree-of-function adaptability deriving unit 2612 that derives the degree of adaptability in security function of each product combination candidate with use of the degree-of-function achievement calculating table 2602 and the counter risk values of function requisites; a total introduction cost deriving unit 2613 that derives the total cost for introduction with use of the product cost table 2603 and the selected product combination; a degree-of-assurance adaptability deriving unit 2614 that compares an assurance level required of each of the products and the assurance level of the product and derives the degree of adaptability in security assurance; and an optimum product combination deciding unit 2615 that derives an optimum product combination with use of the derived degree of function adaptability, degree of assurance adaptability, and total introduction cost.

Figure 27A:
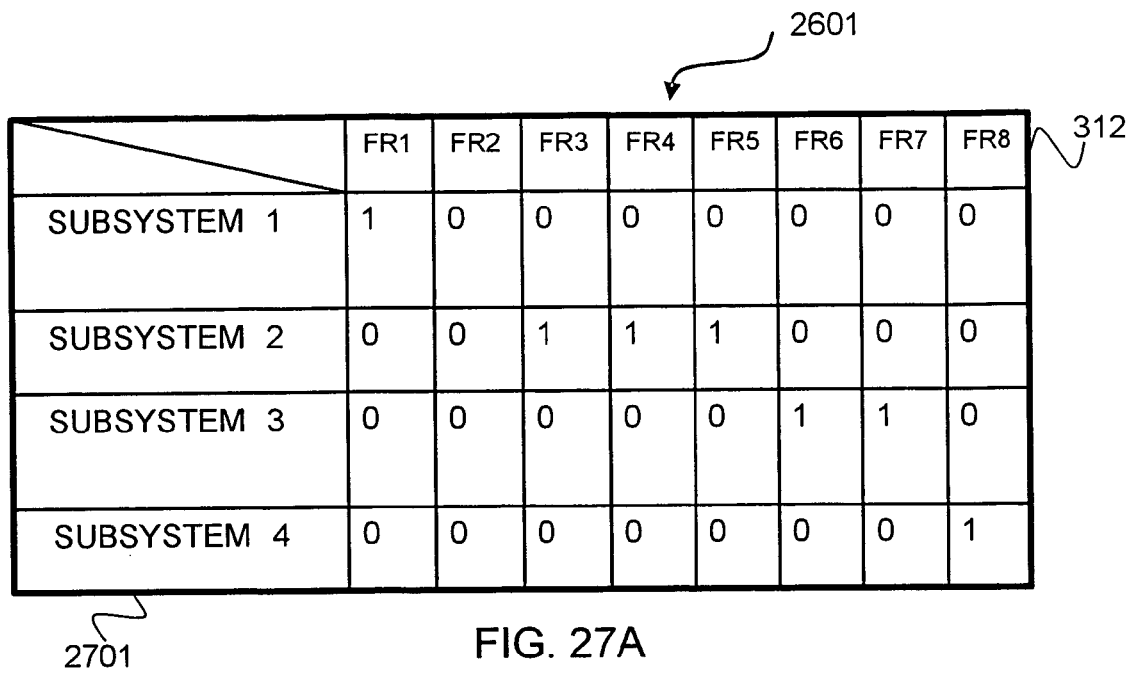
FIG. 27 is a diagram of an example of information stored in a function requisite-to-subsystem correspondence table, a degree-of-function achievement calculating table, a product cost table, and a product assurance level table according to a fourth embodiment.

Next, various additional tables as compared to those of the first embodiment in the external storage device 103 will be described in detail. First, FIG. 27A shows the function requisite-to-subsystem correspondence table 2601 indicating the arrangement of function requisites for subsystems forming a system. In this table 2601, a column 2701 indicates the names of the subsystem and a row 312 indicates the identifiers of security function requisites. Its matrix portion indicates the correspondence of which function requisite is assigned to which subsystem, where 0 (zero) denotes no correspondence existing and 1 denotes a correspondence existing.

Figure 27B:
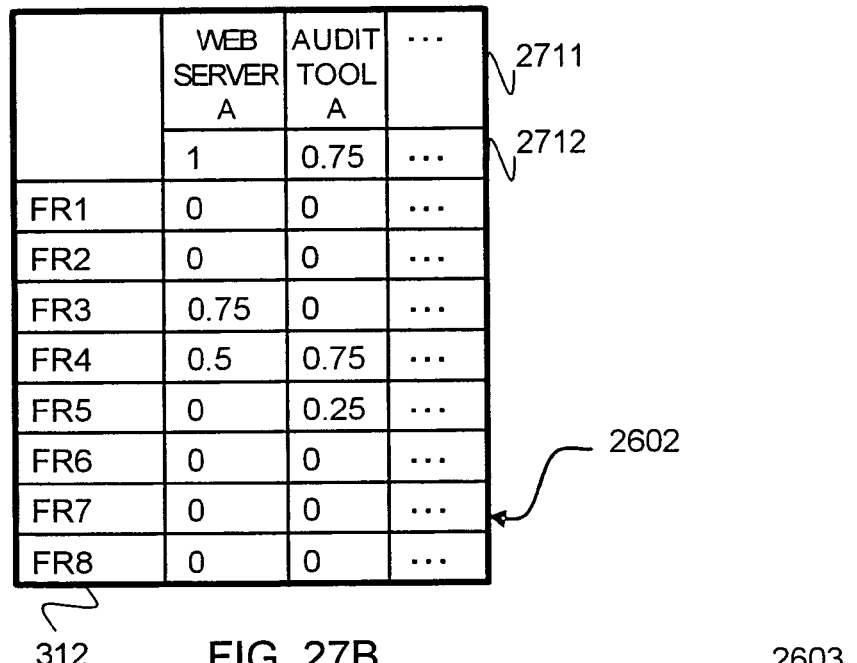

FIG. 27B shows the degree-of-function achievement calculating table 2602 needed to calculate the degree of achievement in security function of each product as a candidate for selection. In this table 2602, a column 312 indicates the identifiers of security function requisites, a row 2711 product names, and a row 2712 indicates the degree of satisfaction in security function of each product. The degree of satisfaction is set to the degree of satisfaction in security function of each product, which takes on, e.g., five steps (not usable at all: 0.0, not much usable: 0.25, usable: 0.5, much usable: 0.75, and substantially usable: 1.0. The matrix portion has set therein the degrees of association between products and function requisites, e.g., in five steps (no association: 0.0, little association: 0.25, some association: 0.5, strong association: 0.75, and direct correspondence: 1.0).

Figure 27C:
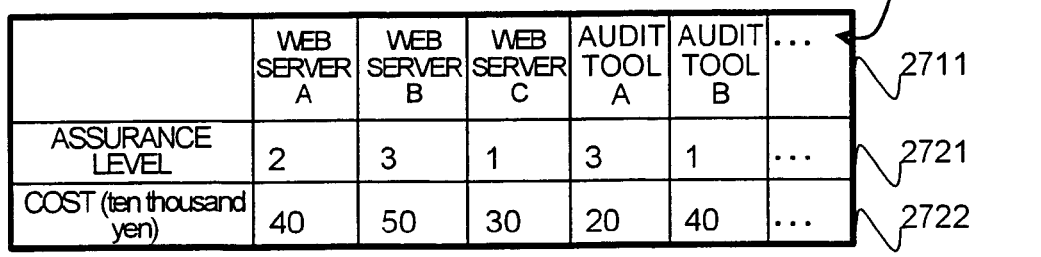

FIG. 27C shows the product cost table 2603 and the product assurance level table 2603 for the products as candidates for selection. In this table 2603, a row 2711 product names, a row 2721 indicates the assurance level of each product, and a row 2722 indicates the cost of each product.

The degree-of-function achievement calculating table 2602 and the product cost table 2603 are input as prior data before using the design/evaluation support tool.

Figure 28:
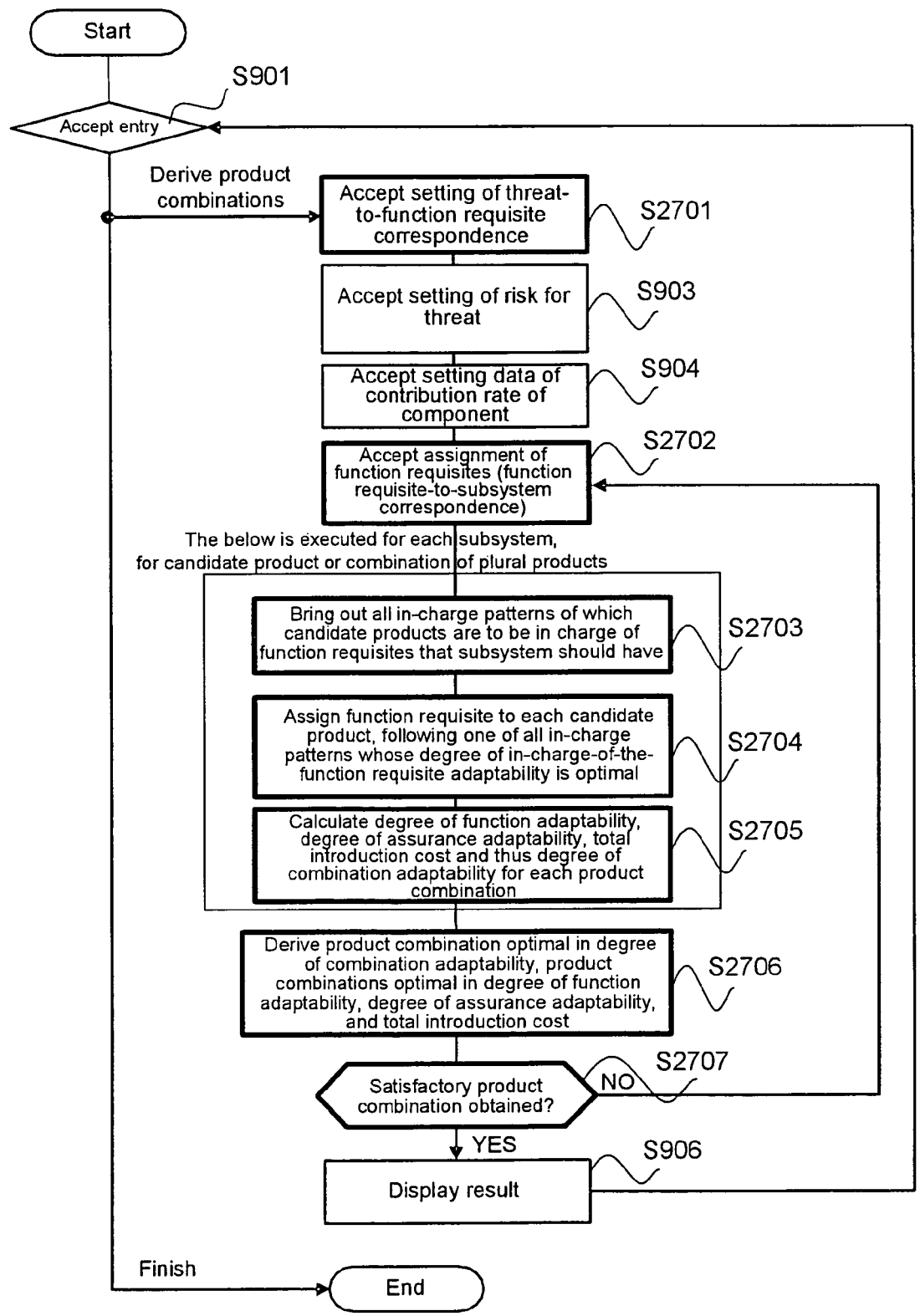
FIG. 28 is a flowchart of tool operation in a system security design/evaluation support method according to the fourth embodiment.

FIG. 28 is a flow chart illustrating the operation of the tool in a system security design/evaluation support method of the fourth embodiment. Steps 901, 903, 904, and 906 are the same as in the first embodiment. Hence, only steps 2701 to 2707 will be described.

The user interface processing unit 113 of the design/evaluation support tool 100 outputs to the display 104, etc., the screen 1001 that accepts the setting of the threat-to-function requisite correspondence as shown in FIG. 10 by way of an example. FIG. 10 shows only a screen for inputting threat-to-security target correspondences because of page space, but in practice, all data of the threat-to-function requisite correspondence are input. The operator inputs information on threats, security targets, and function requisites, and correspondences between them through the screen 1001. The step 2701 differs from step 901 of the first embodiment in that in security designing, correspondences with components are not set since which products are to be introduced as components is not yet decided.

When the operator finishes the input and presses the determination button 1220, the user interface processing unit 113 of the design/evaluation support tool 100 stores the accepted information on threats, security targets, and function requisites, and correspondences between them in the threat-tofunction requisite correspondence table 125 and process proceeds to the next step (S2701).

Figure 29:
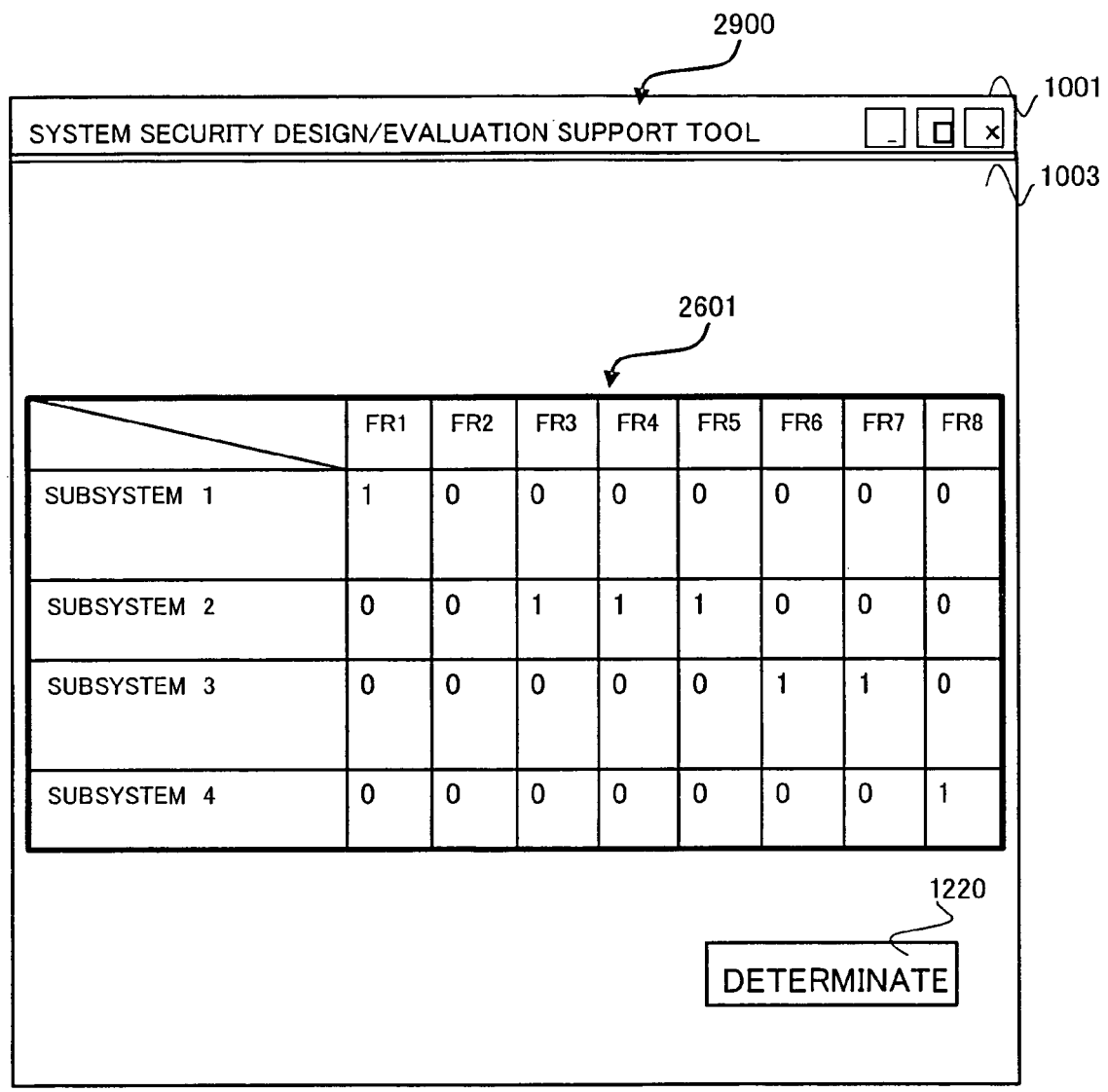
FIG. 29 is a diagram of an example of a screen accepting the setting of the function requisite-to-subsystem correspondence table according to the fourth embodiment.

Next, the user interface processing unit 113 of the design/evaluation support tool 100 outputs to the display 104, etc., the screen 1001 that accepts the setting of the function requisite-to-subsystem correspondence as shown in FIG. 29 by way of an example. The operator inputs information on function requisites and subsystems, and correspondences between them through the screen 1001.

When the operator finishes the input and presses the determination button 1220, the user interface processing unit 113 of the design/evaluation support tool 100 stores the accepted information on function requisites and subsystems, and correspondences between them in the function requisite-to-subsystem correspondence table 2601 and process proceeds to the next step (S2702).

Next, the design/evaluation support tool 100 executes steps 2703 to 2705 for a product as candidates or a combination of plural products for each subsystem listed in the function requisite-to-subsystem correspondence table 2601.

First, the tool 100 decides, for a product as candidates or a combination of plural products, which products are to be in charge of the function requisites to be satisfied by the subsystem with use of the in-charge-of-the function requisite rule. Then, the tool 100 identifies function requisites having correspondence in function with a product (the degree of association of 0.25 or greater with the product), and brings out all in-charge patterns of which candidate products are to be in charge of the function requisites that each subsystem should have (S2703).

Next, for all the in-charge patterns brought out in step 2703, with use of the function requisites to be satisfied by the subsystem that the products are to be in charge of and the degrees of achievement by the candidate products (or the product combination) and the degrees of importance of the function requisites obtained from the counter risk values of the function requisites, the degree of function adaptability is derived by taking the sum of the absolute values of the differences between the degrees of achievement and the corresponding degrees of importance (refer to the reference 2 for a detailed deriving method). Also, by deriving threat-to-component correspondences based on the arrangement of function requisites identified for each in-charge pattern, the assurance level to be required of each product is derived according to the procedure of the first, second or third embodiment, and then by comparing the assurance level to be required of each product and the actual assurance level of the product, the degree of assurance adaptability is derived.

The degree of assurance adaptability takes on five values, 1: the assurance levels of all candidate products being at or above a required assurance level, 2: the assurance level of one candidate product being below a required assurance level (some products of no less than a required assurance level existing), 3: the assurance levels of all candidate products being at or above a lowest required assurance level, 4: the assurance level of one candidate product being below a required assurance level (some products of no less than a required assurance level existing), and 5: the assurance levels of all candidate products being below a required assurance level.

The derived degrees of assurance adaptability and degrees of function adaptability are normalized to make their scales match. The method of normalizing is to obtain a maximum and a minimum for each axis and calculate (p−minimum)/(maximum−minimum) for each element p, or to use a deviation value for each element p. Or, if it can make the scales of the axes match, another method can be used to normalize.

Next, a function requisite to be satisfied by a subsystem is assigned to each candidate product based on an in-charge pattern for which the degree of in-charge-of-the-function requisite adaptability is optimal that has been obtained by calculating a weighted average of the normalized degrees of function adaptability and degrees of assurance adaptability (S2704).

With use of FIG. 30, the procedure of steps 2703 to 2704 of deciding a product to be in charge of the function requisite to be satisfied by a subsystem will be described. In the table of FIG. 30, a row 3001 indicates counter risk values at which the function requisites to be satisfied by the subsystem counter threat risks respectively; a row 3002 the degrees of importance of the function requisites; rows 3003, 3004 the degrees of function achievement of the candidate products; rows 3011, 3012 the degrees of function achievement calculated for each in-charge pattern indicating which product are to be in charge of the function requisites to be satisfied by the subsystem; and rows 3021, 3022 the lowest required assurance level, the required assurance level, the degree of assurance adaptability, and the degree of function adaptability for each in-charge pattern.

The degree of importance indicates on the basis of the counter risk value for each function requisite how important the function requisite is (e.g., five steps of not important: 0, not much important: 0.2, important: 0.5, fairly important: 0.75, and very important: 1.0, or not applicable). This setting may be performed by an operator based on their subjectivity, or preparing a mapping table between the counter risk values and the degrees of importance in advance, the degree may be calculated by an appropriate tool.

FIG. 30 supposes a situation where for a subsystem 2, "WEB server A" and "Audit tool A" are selected as a candidate product combination. First, since it is seen from the row 3003 that a function requisite FR3 has association only with WEB server A, it is decided for WEB server A to be in charge thereof. Also, since it is seen from the row 3004 that a function requisite FR3 has association only with Audit tool A, it is decided for Audit tool A to be in charge thereof.

Here, since a function requisite FR4 can be satisfied by either of WEB server A and Audit tool A, all the in-charge patterns are examined. Then, there are two thinkable patterns: (1) WEB server A is in charge of FR3, FR4 and Audit tool A is in charge of FR5, and (2) WEB server A is in charge of FR3 and Audit tool A is in charge of FR4, FR5. Hence, the degree of function achievement of each in-charge pattern brought out is as follows. For pattern (1), FR3: 0.75, FR4: 0.5, and FR5: 0.25, and for pattern (2), FR3: 0.75, FR4: 0.75, and FR5: 0.25 as shown in rows 3011, 3012. The degree of function adaptability is obtained by dividing the sum of the differences between the degrees of function achievement and the degrees of importance by the number of all function requisites (here, eight of FR1 to FR8). For example, the degree of function adaptability of pattern (1) is $((0.75-0.75)+(0.5-0.5)+(0.5-0.25))/8=0.031$, and the degree of function adaptability of pattern (2) is $((0.75-0.75)+(0.5-0.75)+(0.5-0.25))/8=0.063$.

The threat-to-function requisite correspondence is derived based on each in-charge pattern brought out, and the assurance level to be required of each product is derived with use of the threat-to-function requisite correspondence derived, the risk-value table 126, the component contribution rate table 127, and the risk-to-assurance level correspondence table 128. The assurance level to be required of each product is derived in the same way as in the first, second or third embodiment.

For example, when deriving the required assurance level from the sum of the counter risk values, the required assurance level of WEB server A for in-charge pattern (1) is an assurance level of "4" that matches 1040, the sum of counter risk values of FR3, FR4 of 880 and 160 from the risk-to-assurance level correspondence table 128 of FIG. 21B (step 2703). Calculating likewise, the required assurance level of Audit tool A is "1". Table 3020 (FIG. 30B) shows the lowest required assurance level and the required assurance level calculated in this way for each in-charge pattern, the degree of assurance adaptability derived by comparing the required assurance level and the product assurance level, and the degree of function adaptability derived.

Next, a weighted average of values into which the degree of assurance adaptability and degree of function adaptability derived for each in-charge pattern are normalized to be comparable is derived as the degree of in-charge-of-the function requisite adaptability, and an in-charge pattern whose the degree of in-charge-of-the function requisite adaptability is optimal (minimal) is determined. For example, the degree of in-charge-of-the function requisite adaptability is derived by equally weighting with a normalizing efficient of 0.25 for the degree of assurance adaptability and normalizing efficient of 10.0 for the degree of function adaptability. As a result, the degree of in-charge-of-the function requisite adaptability is 1.31 for in-charge pattern (1) and 1.38 for in-charge pattern (2). Thus, in-charge pattern (1) is optimal which has a minimum degree of in-charge-of-the-function requisite adaptability.

As such, taking into account both assurance and function in a balanced manner, it can be decided which candidate product is to be in charge of a function requisite to be satisfied by a subsystem.

Next, in step 2705, the design/evaluation support tool 100 derives a degree of function adaptability by taking the sum of the absolute values of the differences between the degrees of achievement and the corresponding degrees of importance, as to the degree of achievement by the candidate product (or product combination) and the degree of importance of each function requisite obtained from the counter risk value of the function requisite, for the function requisites to be satisfied by the subsystem that the products are to be in charge of as decided in steps 2703, 2704 (refer to the reference 2 for a detailed deriving method). Furthermore, by taking the sum of the introduction costs of the products selected as candidates from the product cost table 2603, a total introduction cost is calculated. Moreover, the degree of assurance adaptability is derived by comparing the assurance level required of each product and the actual assurance level of the product. Here, the degree of assurance adaptability takes on five values: 1: the assurance levels of all candidate products being at or above a required assurance level, 2: the assurance level of one candidate product being below a required assurance level (some products of no less than a required assurance level existing), 3: the assurance levels of all candidate products being at or above a lowest required assurance level, 4: the assurance level of one candidate product being below a required assurance level (some products of no less than a required assurance level existing), and 5: the assurance levels of all candidate products being below a required assurance level (S2705).

Next, after steps 2703 to 2705 are executed for each product or combination of plural products as a candidate for all subsystem listed in the function requisite-to-subsystem correspondence table 2601, in step 2706, an optimum product or product combination to realize each subsystem is derived and presented with use of the degree of function adaptability, the total introduction cost and the degree of assurance adaptability which have been derived for each candidate product or combination of plural products.

Figure 31:
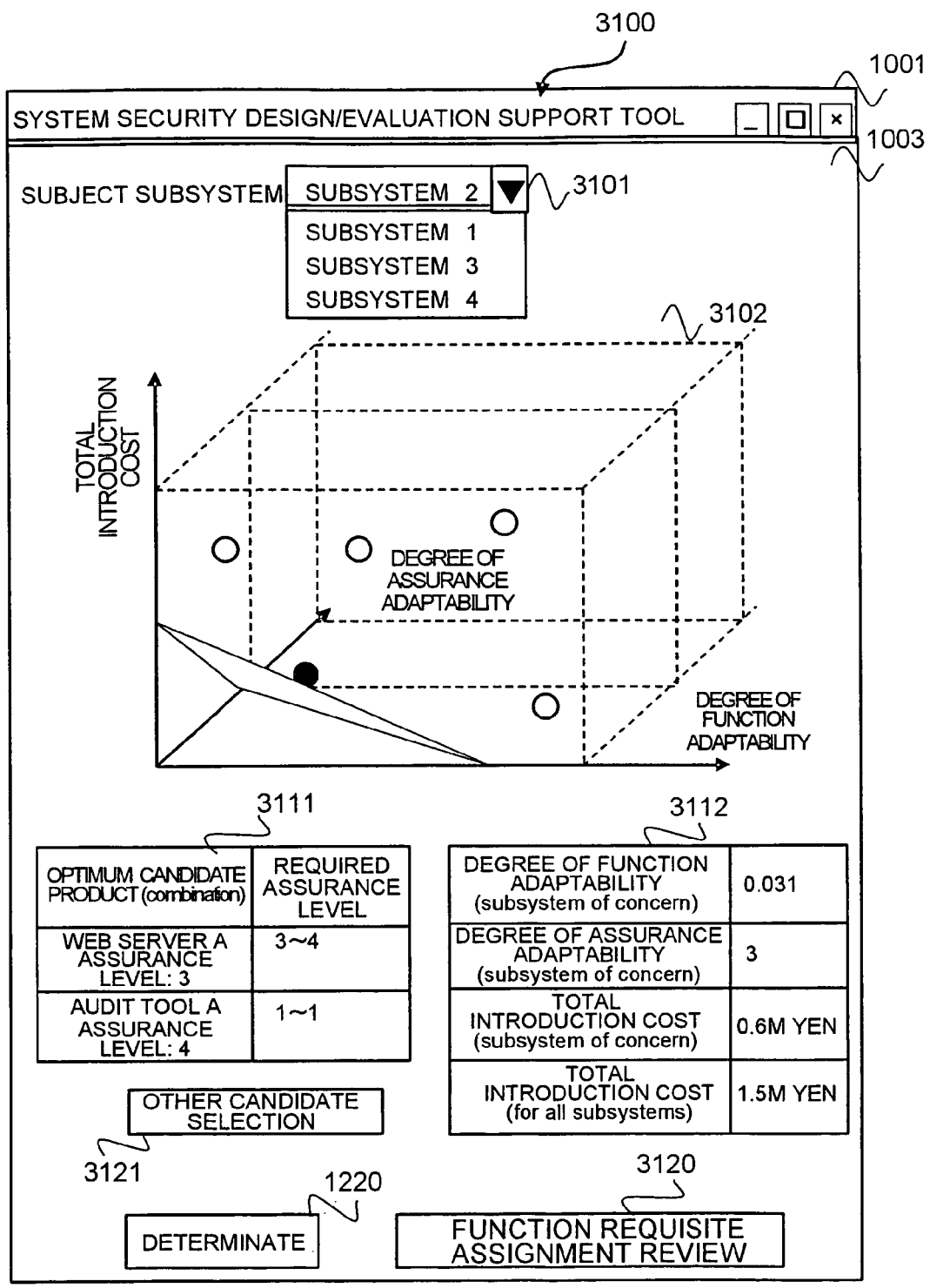
FIG. 31 is a diagram of an example of a screen displaying a derived product combination according to the fourth embodiment.

FIG. 31 is an example of a screen 3100 presenting an optimum product or product combination to the operator. The operator selects which subsystem is a subject, from a subsystem pull down 3101. When selecting, the user interface processing unit 113 of the design/evaluation support tool 100 displays a graph 3102, an optimum candidate product (or combination) table 3111, and a degree of function adaptability-degree of assurance adaptability-cost table 3112 for the selected subsystem on the screen 3100.

Here, a graph 3102 has a horizontal axis (x axis) representing the degree of function adaptability, a backward axis in the page (y axis) representing the degree of assurance adaptability and a vertical axis (z axis) representing the total introduction cost, and in the graph, a filled circle represents an optimum product combination candidate and open circles represent other product candidates.

The degree of function adaptability, the degree of assurance adaptability and the total introduction cost are normalized to make their scales match. The method of normalizing is to obtain a maximum and a minimum for each axis and calculate (p−minimum)/(maximum−minimum) for each element p. Or, if it can make the scales of the axes match, another method can be used to normalize.

The optimum candidate product (or combination) table 3111 shows an optimum candidate product (or combination) for which a degree of combination adaptability obtained by calculating the weighted average of the normalized degree of function adaptability, degree of assurance adaptability and total introduction cost is optimal (i.e., minimal in value). In this example, WEB server A having an assurance level of "3" and Audit tool A having an assurance level of "4" are derived as optimum candidate products to realize the "subsystem 2".

The degree of function adaptability-degree of assurance adaptability-cost table 3112 shows the degree of function adaptability, degree of assurance adaptability, and total introduction cost calculated for the optimum candidate product (or combination), and the sum of the total introduction costs calculated for all subsystems.

Figure 32:
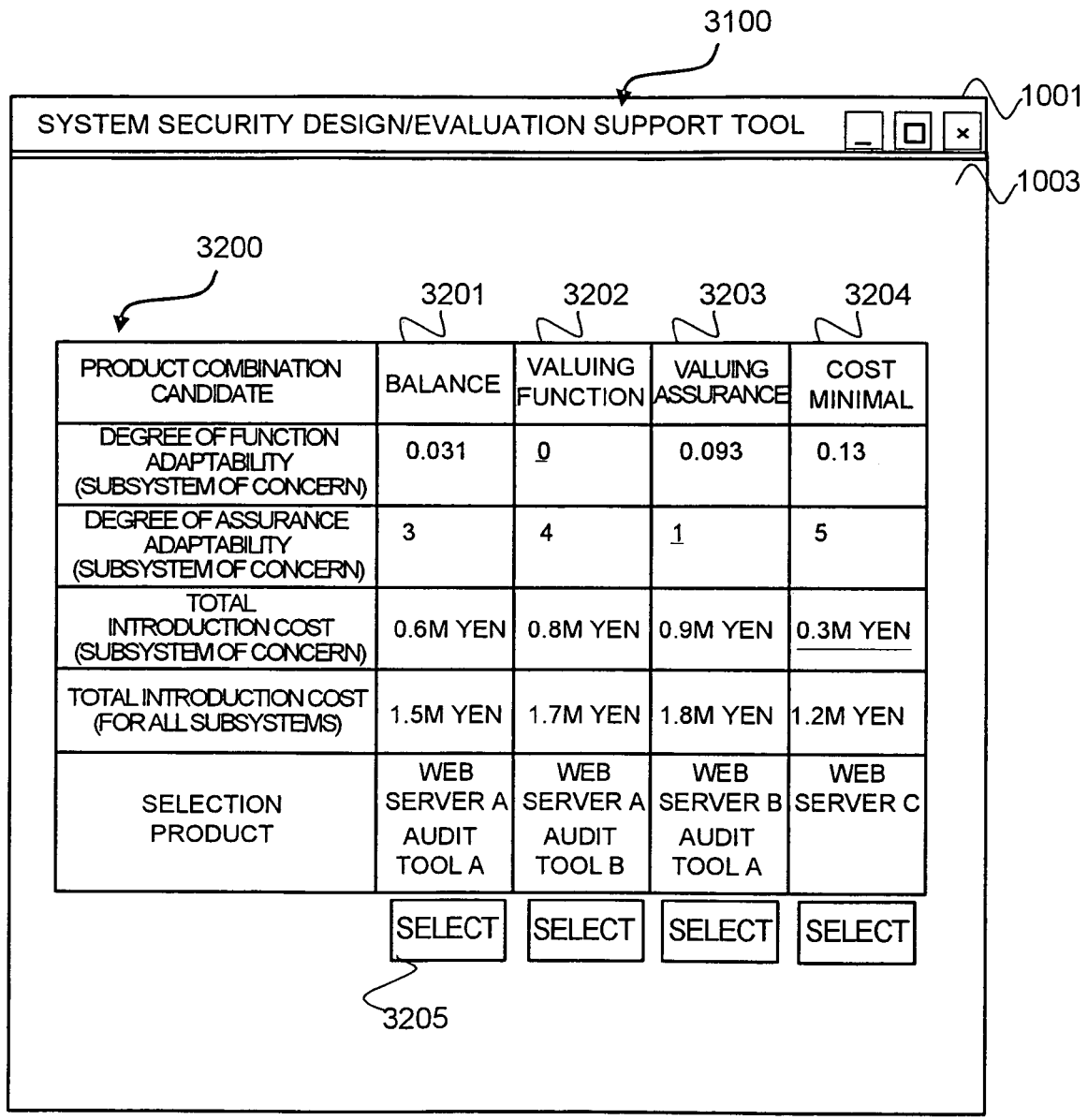
FIG. 32 is a diagram of an example of a screen displaying a derived product combination according to the fourth embodiment.

Next, if adopting the derived optimum candidate product (or combination), the operator presses the determination button 1220, and if wanting to examine other candidates, presses an other candidate selection button 3121. If the other candidate selection button 3121 is pressed, the user interface processing unit 113 of the design/evaluation support tool 100 displays an optimum product combination table 3200 for the selected subsystem on the screen 3100 as shown in FIG. 32 by way of an example.

The optimum product combination table 3200 is a table showing the degree of function adaptability, degree of assurance adaptability, and total introduction cost (for the subsystem), and the sum of the total introduction costs (for all subsystems) for each of an optimum candidate product (or combination) indicated in a column 3201, a candidate product (or combination) valued in function indicated in a column 3202, a candidate product (or combination) valued in assurance indicated in a column 3203, and a candidate product (or combination) valued in cost indicated in a column 3204.

The operator selects either a product combination that satisfies requirements in function, assurance, and cost in a balanced manner taking into account each parameter of the optimum product combination table 3200, or a product combination focusing particularly on one of the requirements depending on the system owner's needs and the like, and presses a corresponding select button 3205. According to the pressed button, the user interface processing unit 113 of the design/evaluation support tool 100 changes the graph and tables of FIG. 31 to correspond to the selected product combination and displays in the screen 3100.

If a satisfactory product combination is obtained, the operator presses the determination button 1220. Process proceeds to step 906, where if determining that the arrangement of the function requisites to be satisfied by the subsystem needs to be reviewed, the operator presses a function requisite arrangement review button 3120. Then, process returns to step 2702, where the setting of the subsystem-to-function requisite correspondence is performed again (S2707).

In this way, in system security designing, as to a product combination to realize subsystems into which a system is divided in terms of function, an optimum one can be selected from the viewpoint of security function, assurance and cost.

The functional blocks 110 to 113 and 2611 to 2615 of the system security design/evaluation support tool 100 as set forth hereinabove may be implemented as hardware or may be implemented as a program loaded in an appropriate storage device such as memory or HDD (Hard Disk Drive). In this case, upon program running, the CPU 101 reads the program from the external storage device 103 into the memory 102 to run the program.

According to this embodiment, it becomes feasible to derive a proper assurance level of a component conforming to the magnitude of the risk of a threat that a subject system is assumed to suffer.

It can also be confirmed upon execution of the security evaluation of a subject system whether the subject system is made up of products having proper assurance levels as components and whether newly developed parts have proper assurance levels, by comparing the above derived proper assurance levels of the components with assurance levels of products and newly developed parts actually making up the subject system.

When performing security design of a subject system composed of components such as a plurality of products or newly developed parts, the capability to derive a proper assurance level for each of the components eliminates the need to require excessively high assurance levels of component parts consisting of the plurality of products, thus advantageously increasing the choice of the existing products and reducing the time and costs taken for design, development, evaluation of the newly developed parts.

Furthermore, when performing security design of a subject system composed of components such as a plurality of products or newly developed parts, deciding which products of an actually existing product combination are to be in charge of the function requisites to be satisfied by the subsystems into which a system is divided in terms of function from the viewpoint of security function and assurance eliminates the need to require excessively high assurance levels of component parts consisting of the plurality of products, thus advantageously increasing the choice of the existing products and reducing the time and costs taken for design, development, evaluation of the newly developed parts.

While the present invention has specifically been described hereinabove based on the embodiments thereof, the present invention is not intended to be limited to the embodiments and can variously be altered or changed without departing from its spirit.

We claim:

1. A system security design/evaluation support tool implemented by a computer including a storage device, deriving an assurance level of security for each of components of a subject system operating on an information processing apparatus and made up of two or more components, comprising:
    a threat-to-component correspondence table stored in the storage device storing therein correspondence between a threat that the subject system assumes and a security function that the component has;
    a risk-value table stored in the storage device storing therein information of a risk value indicative of the magnitude of a risk of the threat;
    a component contribution rate table stored in the storage device storing therein information on the magnitude of effect of the security function that the component has and that counters the threat;
    a risk-to-assurance level correspondence table stored in the storage device storing therein correspondence between a risk value and an assurance level required corresponding to the risk value;
    a table link use unit identifying linkages between the threat-to-component correspondence table, the risk-value table, the component contribution rate table, and the risk-to-assurance level correspondence table, based on their respective overlapping items; and
    a component assurance level deriving unit weighting an assurance level of each of the components, that conforms to a risk value of a threat that a security function of each of the components counters, by weighting the risk value of the threat with a component contribution rate based on linkages of the tables.

2. The system security design/evaluation support tool of claim 1, comprising:
    a contribution rate calculating unit calculating the component contribution rate by identifying a linkage between a table stored in the storage device storing therein the rate of contribution of a security objective corresponding to the threat, a table stored in the storage device storing therein the rate of contribution of a security function requisite corresponding to the security objective, and a table stored in the storage device storing therein correspondence between the security function requisite and the security function that each of the components has, based on their respective overlapping items, and by identifying, on a threat-by-threat basis, the rate of contribution of the security objective borne by the security function requisite of the security function that each of the components has.

3. The system security design/evaluation support tool of claim 1, wherein the component assurance level deriving unit identifies a group of threats corresponding to each of the components using the threat-to-component correspondence table, calculates as a counter risk value of the component the sum of the products of the respective risk values of the threats of the group of threats and respective corresponding component contribution rates using the risk-value table and the component contribution rate table, and matches the counter risk value against the risk-to-assurance level correspondence table to derive an assurance level of the component.

4. The system security design/evaluation support tool of claim 1, wherein the component assurance level deriving unit identifies a group of threats corresponding to the component using the threat-to-component correspondence table, calculates as a counter risk value of the component the sum of the products of the respective risk values of the threats of the group of threats and respective corresponding component contribution rates using the risk-value table and the component contribution rate table, and matches the counter risk value against the risk-to-assurance level correspondence table to derive a required assurance level of the component.

5. The system security design/evaluation support tool of claim 3, wherein the component assurance level deriving unit identifies a group of threats corresponding to the component using the threat-to-component correspondence table, calculates as a lowest counter risk value of the component the maximum or the minimum of the risk values of all threats included in the group of threats using the risk-value table, and matches the lowest counter risk value against the risk-to-assurance level correspondence table to derive a lowest assurance level of the component.

6. The system security design/evaluation support tool of claim 4, wherein the component assurance level deriving unit identifies a group of threats corresponding to the component using the threat-to-component correspondence table, calculates as a lowest counter risk value of the component the maximum or the minimum of the products of the respective risk values of the threats of the group of threats and respective corresponding component contribution rates using the risk-value table and the component contribution rate table, and matches the lowest counter risk value against the risk-to-assurance level correspondence table to derive a lowest assurance level of the component.

7. A system security design support tool implemented by a computer including a storage device which derives an optimum product combination out of two or more candidate products and which product is to be in charge of a security function requisite to be satisfied by the system, for a subject system operating on an information processing apparatus and made up of one or more components, the tool comprising:

a threat-to-function requisite correspondence table stored in the storage device storing therein correspondence between expected threats to the subject system and security function requisites to be satisfied by the system;

a risk-value table stored in the storage device storing therein information of a risk value indicative of the magnitude of a risk of each of the threats;

a function requisite-to-product correspondence table stored in the storage device storing therein correspondence between each of the candidate products and a security function requisite that the candidate product has;

a product assurance level table stored in the storage device storing therein an assurance level of each of the candidate products;

a function requisite contribution rate table stored in the storage device storing therein information on the magnitudes of respective effects of security function requisites that counters the threats;

a risk-to-assurance level correspondence table stored in the storage device storing therein correspondence between a risk value and an assurance level that is required in response to the risk value;

a table link use unit that identifies linkages between the threat-to-function requisite correspondence table, the risk-value table, the function requisite-to-product correspondence table, the product assurance level table, the function requisite contribution rate table, and the risk-to-assurance level correspondence table on the basis of their respective duplicate items;

a component assurance level deriving unit that creates product combination candidates each formed of one or more candidate products which satisfy security function requisites to be satisfied by the subject system based on the linkages between the tables and, for each of the created product combination candidates, creates one or more in-charge patterns in each of which each product of the product combination candidate is in charge of a security function requisite to be satisfied by the subject system and, for each of all the created in-charge patterns of the product combination candidates, calculates a component contribution rate of each product of the product combination candidate which relates to the degree of an effect of the respective security function requisite to counter one of the threats based on the linkages between the tables, and weights the risk value of the respective threat with the component contribution rate, thereby weighting an assurance level to be required of each of the products that matches the risk value of the respective threat that the respective security function counters;

a degree-of-assurance adaptability deriving unit that, for each of all the created in-charge patterns of the product combination candidates, compares in value an assurance level to be required of each of the products and an assurance level of each product of the product combination candidate identified by referencing the product assurance level table, thereby deriving a degree of assurance adaptability; and an optimum product combination deciding unit that identifies as an optimum product combination one of the in-charge patterns of the product combination candidates whose degree of assurance adaptability is optimal and decides which products are to be in charge of the security function requisites to be satisfied by the subject system.

8. The system security design support tool of claim 7, further comprising:

a contribution rate calculating unit that identifies a linkage between a table storing contribution rates of security objectives corresponding to the threats and a table storing contribution rates of security function requisites corresponding to the security objectives on the basis of respective duplicate items of the tables, and identifies, for each threat, contribution rates of security objectives of which the security function requisites are to be in charge, thereby calculating contribution rates of the security function requisites.

9. The system security design support tool of claim 8, wherein the component assurance level deriving unit identifies a threat group for each of the components for each of the in-charge patterns of the product combination candidates with use of the threat-to-function requisite correspondence table and the function requisite-to-product correspondence table, calculates as a counter risk value for the component the sum of the products of the respective risk values of the threats of the threat group and respective corresponding component contribution rates with use of the risk-value table and the calculated component contribution rates, and matches the counter risk value against the risk-to-assurance level correspondence table, thereby deriving an assurance level of the component to evaluate a reliability of the security of the system.

10. The system security design support tool of claim 7, wherein the optimum product combination deciding unit calculates, for each of the in-charge patterns of the product combination candidates, a degree of function achievement of each function requisite with use of a degree-of-function achievement calculating table storing a degree of satisfaction of users for each of the products and degrees of association between the function requisites and the products, derives a degree of function adaptability by taking an average of the absolute values of the differences between the calculated degrees of function achievement and respective degrees of importance of the function requisites to be satisfied by the system, calculates, for each of the in-charge patterns of the product combination candidates, as a degree of combination adaptability the sum of the products of the degree to which security function and assurance are valued, and the degree of function adaptability and the degree of assurance adaptability respectively, and identifies as an optimum product combination an in-charge pattern of the product combination candidates of which the degree of combination adaptability is optimal, thereby deciding which products are to be in charge of the security function requisites to be satisfied by the system to evaluate the reliability and to improve the security of the system.

11. The system security design support tool of claim 10, wherein the optimum product combination deciding unit references a product cost table storing a cost for introduction of each product and, for each of the in-charge patterns of the product combination candidates, derives a total introduction cost by taking the sum of costs for introduction of the products, and calculates, for each of the in-charge patterns of the product combination candidates, as a degree of combination adaptability the sum of the products of the degree to which security function, assurance, and cost are valued, and the degree of function adaptability, the degree of assurance adaptability, and the total introduction cost respectively to evaluate the reliability and to improve the security of the system.

12. A program operable to drive a computer including a storage device to execute a method of weighting an assurance level of security for each of components of a subject system operating on an information processing apparatus and made up of two or more components, the computer forced to execute the steps of:

by use of a threat-to-component correspondence table stored in the storage device storing therein correspondence between a threat that the subject system assumes and a security function that the component has, a risk-value table stored in the storage device storing therein information of a risk value indicative of the magnitude of a risk of the threat, a component contribution rate table stored in the storage device storing therein information on the magnitude of effect of the security function that the component has and that counters the threat, and a risk-to-assurance level correspondence table stored in the storage device storing therein correspondence between a risk value and an assurance level required corresponding to the risk value, identifying linkages between the tables based on their respective duplicate items; and weighting the risk value of the threat with a component contribution rate based on linkages of the tables, to weight an assurance level of each of the components that conforms to a risk value of a threat that a security function of each of the components counters.

13. A program operable to drive a computer including a storage device to execute a method of deriving an optimum product combination out of one or more candidate products and which product is to be in charge of a security function requisite to be satisfied by the system, for a subject system operating on an information processing apparatus and made up of two or more components, the computer forced to execute the steps of:

by use of a threat-to-function requisite correspondence table stored in the storage device storing therein correspondence between expected threats to the subject system and security function requisites to be satisfied by the system, a risk-value table stored in the storage device storing therein information of a risk value indicative of the magnitude of a risk of each of the threats, a function requisite-to-product correspondence table stored in the storage device storing therein correspondence between each of the candidate products and a security function requisite that the candidate product has, a product assurance level table stored in the storage device storing therein an assurance level of each of the candidate products, a function requisite contribution rate table stored in the storage device storing therein information on the magnitudes of respective effects of security function requisites that counters the threats, and a risk-to-assurance level correspondence table stored in the storage device storing therein correspondence between a risk value and an assurance level that is required in response to the risk value, identifying linkages between the threat-to-function requisite correspondence table, the risk-value table, the function requisite-to-product correspondence table, the product assurance level table, the function requisite contribution rate table, and the risk-to-assurance level correspondence table on the basis of their respective duplicate items;

creating product combination candidates which each satisfy security function requisites to be satisfied by the subject system based on the linkages between the tables;

for each of the created product combination candidates, creating one or more in-charge patterns in each of which each product of the product combination candidate is in charge of a security function requisite to be satisfied by the subject system;

for each of all the created in-charge patterns of the product combination candidates, calculating a component contribution rate of each product of the product combination candidate which relates to the degree of an effect of the respective security function requisite to counter one of the threats based on the linkages between the tables, and weighting the risk value of the respective threat with the component contribution rate, thereby weighting an assurance level to be required of each of the products that matches the risk value of the respective threat that the respective security function counters;

for each of all the created in-charge patterns of the product combination candidates, comparing in value an assurance level to be required of each of the products and an assurance level of each product of the product combination candidate identified by referencing the product assurance level table, thereby deriving a degree of assurance adaptability; and identifying as an optimum product combination one of the in-charge patterns of the product combination candidates whose degree of assurance adaptability is optimal and deciding which products are to be in charge of the security function requisites to be satisfied by the subject system.

14. The system security design support tool of claim 7, wherein the component assurance level deriving unit identifies a threat group for each of the components for each of the in-charge patterns of the product combination candidates with use of the threat-to-function requisite correspondence table and the function requisite-to-product correspondence table, calculates as a counter risk value for the component the sum of the products of the respective risk values of the threats of the threat group and respective corresponding component contribution rates with use of the risk-value table and the calculated component contribution rates, and matches the counter risk value against the risk-to-assurance level correspondence table, thereby deriving an assurance level to be required of the component.

* * * * *